United States Patent
Yang et al.

(10) Patent No.: US 9,587,154 B2
(45) Date of Patent: *Mar. 7, 2017

(54) TREATED ION EXCHANGE RESINS, METHOD OF MAKING, ASSEMBLIES AND HEAT TRANSFER SYSTEMS CONTAINING THE SAME, AND METHOD OF USE

(75) Inventors: Bo Yang, Ridgefield, CT (US); Filipe J. Marinho, Danbury, CT (US); Peter M. Woyciesjes, Woodbury, CT (US); Aleksei V. Gershun, Southbury, CT (US)

(73) Assignee: Prestone Products Corporation, Auckland (NZ)

( * ) Notice: Subject to any disclaimer, the term of this patent is extended or adjusted under 35 U.S.C. 154(b) by 1989 days.

This patent is subject to a terminal disclaimer.

(21) Appl. No.: 11/221,595

(22) Filed: Sep. 8, 2005

(65) Prior Publication Data
US 2006/0049167 A1    Mar. 9, 2006

Related U.S. Application Data

(60) Provisional application No. 60/607,974, filed on Sep. 8, 2004.

(51) Int. Cl.
*H01M 8/04*    (2016.01)
*C09K 5/10*    (2006.01)
(Continued)

(52) U.S. Cl.
CPC .............. *C09K 5/10* (2013.01); *B01J 47/006* (2013.01); *C08J 5/20* (2013.01); *H01M 8/04029* (2013.01);
(Continued)

(58) Field of Classification Search
CPC ...... B01J 47/006; C08J 5/20; H01M 8/04029; C09K 5/10; Y02E 60/50
(Continued)

(56) References Cited

U.S. PATENT DOCUMENTS 3,216,948 A    11/1965  Redding ............... 252/301.2
3,507,702 A     4/1970  Sanderson ............. 136/86
(Continued)

FOREIGN PATENT DOCUMENTS

CA    2344856    3/2000    ............ H01M 8/04
CA    2430443    7/2002    ............ C09K 5/20
(Continued)

OTHER PUBLICATIONS

Katritzky, Adventures with Benzotriazole, 2002.*
(Continued)

*Primary Examiner* — Gary Harris
(74) *Attorney, Agent, or Firm* — Gregory H. Zayia; Barnes & Thornburg LLP

(57) ABSTRACT

Disclosed is a pre-treated ion exchange resin comprising at least 15% by total number of exchangeable groups comprising at least one of an ion, or a Lewis acid, or a Lewis base resulting from a heat transfer fluid component having a $pK_a$ or $pK_b$ of greater than 5 in an aqueous solution at 25° C., based on the total number of exchangeable groups. In one embodiment, the heat transfer fluid component is at least one of a colorant, a corrosion inhibitor, an antifoaming agent, a bitterant, a dispersant, or a combination thereof. In one embodiment, the heat transfer fluid component comprises a heat transfer fluid corrosion inhibitor. Also disclosed are heat transfer systems, assemblies, fuel cell systems and methods of maintaining a conductivity of less than 200 µS/cm in a heat transfer fluid that employ the disclosed pre-treated ion exchange resins.

18 Claims, 5 Drawing Sheets

(51) Int. Cl.
    *B01J 47/00* (2006.01)
    *C08J 5/20* (2006.01)
    *F01P 11/06* (2006.01)
(52) U.S. Cl.
    CPC ......... *F01P 2011/068* (2013.01); *Y02E 60/50* (2013.01); *Y02P 70/56* (2015.11)
(58) Field of Classification Search
    USPC ..................................................... 429/12–46
    See application file for complete search history.

(56) References Cited

U.S. PATENT DOCUMENTS

| | | | |
|---|---|---|---|
| 3,960,740 A | 6/1976 | Truett | 252/73 |
| 3,964,930 A | 6/1976 | Reiser | 136/86 R |
| 4,284,729 A | 8/1981 | Cross et al. | 521/158 |
| 4,402,847 A | 9/1983 | Wilson et al. | 252/75 |
| 4,514,427 A | 4/1985 | Mitchell et al. | |
| 4,584,125 A | 4/1986 | Griswold et al. | |
| 4,648,883 A | 3/1987 | Podder | 8/527 |
| 5,200,278 A | 4/1993 | Watkins et al. | 429/24 |
| 5,723,060 A | 3/1998 | Bruhnke et al. | 252/73 |
| 5,725,794 A | 3/1998 | Bruhnke et al. | 252/73 |
| 5,776,624 A | 7/1998 | Neutzler | 429/26 |
| 6,235,217 B1* | 5/2001 | Turcotte et al. | 252/76 |
| 6,486,248 B2 | 11/2002 | Ashley et al. | 524/358 |
| 6,528,564 B1 | 3/2003 | Xia | |
| 6,605,126 B1 | 8/2003 | Xia et al. | 8/647 |
| 6,663,993 B2 | 12/2003 | Imaseki et al. | 429/26 |
| 6,673,482 B2 | 1/2004 | Imazeki et al. | 429/26 |
| 6,709,779 B2 | 3/2004 | Uozumi | 429/24 |
| 2001/0050191 A1 | 12/2001 | Ogawa et al. | 180/65.3 |
| 2002/0031693 A1 | 3/2002 | Ishikawa | 429/26 |
| 2002/0063088 A1 | 5/2002 | Hidaka et al. | |
| 2002/0076591 A1 | 6/2002 | Imaseki et al. | |
| 2003/0072981 A1 | 4/2003 | Imaseki et al. | 429/13 |
| 2004/0001984 A1 | 1/2004 | Alva | 429/26 |
| 2004/0028963 A1 | 2/2004 | Kormann et al. | |
| 2004/0028971 A1 | 2/2004 | Wenderoth et al. | |
| 2004/0086757 A1* | 5/2004 | Mohapatra | 429/26 |
| 2004/0110050 A1 | 6/2004 | Abd Elhamid et al. | |
| 2004/0129920 A1 | 7/2004 | Wenderoth et al. | 252/71 |
| 2006/0093999 A1* | 5/2006 | Hei | A61L 2/00 435/2 |
| 2006/0258758 A1* | 11/2006 | Onodera et al. | 521/27 |

FOREIGN PATENT DOCUMENTS

| | | | |
|---|---|---|---|
| CA | 2435593 | 8/2002 | H01M 8/04 |
| CA | 2445792 A1 | 11/2002 | C09K 5/20 |
| CA | 2449208 A1 | 12/2002 | C09K 5/20 |
| EP | 0 376 126 | 7/1990 | C02F 1/00 |
| EP | 1262535 A1 | 12/2002 | C09K 5/10 |
| EP | 1304367 A1 | 4/2003 | C09K 5/20 |
| EP | 1323677 | 7/2003 | |
| EP | 1 416 563 A1 | 5/2004 | H01M 8/04 |
| EP | 1416563 A1 | 5/2004 | H01M 8/04 |
| EP | 1457542 A2 | 9/2004 | |
| HU | 209546 | 7/1994 | C09K 5/00 |
| JP | 8185877 | 7/1996 | H01M 8/04 |
| WO | WO 00/17951 | 3/2000 | H01M 8/04 |
| WO | WO0175999 | 10/2001 | |
| WO | 02055759 | 7/2002 | |
| WO | WO 02/055630 A1 | 7/2002 | C09K 5/20 |
| WO | WO 02/090462 A1 | 11/2002 | C09K 5/20 |
| WO | WO 02/101848 A2 | 12/2002 | |
| WO | WO 02/101848 A3 | 12/2002 | C09K 5/20 |
| WO | WO 03/033616 A1 | 4/2003 | C09K 5/20 |
| WO | WO 03/061044 A2 | 7/2003 | H01M 8/04 |
| WO | WO 03/061044 A3 | 7/2003 | H01M 8/04 |
| WO | WO 03/070854 A1 | 8/2003 | C09K 5/10 |
| WO | 2004/053015 A1 | 6/2004 | C09K 5/20 |

OTHER PUBLICATIONS

Educ. Reso for Part. Techn. 032Q-Nelson, Dispersing Powders in Liquids, Part 3, Copyright 2003 Ralph Nelson, Licensed to ERPT, pp. 4: 1-12.
"Amberlyst Weak Base Anions", Internet Article, URL: http://web.archive.org/web/20040623050423/http://www..rohmhaas.com/ionexchange/IP/wba.htm, Jun. 23, 2004.
"Physical Sciences Information Gateway—Chemical Data Tablesy", Internet Article, URL: http://web.archive.org/web/20040305150910/http://www.psigate.ac.uk/newsite/reference/chemdata/12.html, Mar. 5, 2004.
International Search Report dated Dec. 28, 2005, for PCT/US2005/032173, International Filing Date Sep. 8, 2005.
International Search Report dated Dec. 29, 2005 for PCT/US2005/031778, International Filing Date Sep. 8, 2005.
Dr. F.T. Lange, Dr. C. Schmidt and Dr. H. J. Brauch, Emerging Contaminants for Drinking Water Supplies, Perfluoroalkylcarboxylates and -sulfonates, Jun. 2006, www.riwa.org/e)_publikaties/137_ptfe_report.PDF, 29 pgs.
International Search Report for PCT/US2005/032174 dated Jul. 17, 2006, 8 pgs.
Written Opinion for PCT/US2005/032174 dated Jul. 17, 2006, 16 pgs.
Written Opinion for PCT/US2005/032173 dated Dec. 28, 2005, 5 pgs.
Written Opinion for PCT/US2005/031778 dated Dec. 29, 2005, 9 pgs.
International Search Report dated Jan. 22, 2007 for International Application No. PCT/US2005/031834, International Filing Date Sep. 8, 2005.
Written Opinion of the International Searching Authority dated Jan. 22, 2007 for International Application No. PCT/US2005/031834, International Filing Dated Sep. 8, 2005.
European Search Report; European Application No. 10168373.8; Date of Mailing: Dec. 8, 2010; 9 Pages.
Non-final Office Action dated Sep. 2, 2011, in U.S. Appl. No. 13/042,774.
Non-final Office Action dated Sep. 3, 2013, in U.S. Appl. No. 13/042,774.
The Dow Chemical Company Product Information on DOWEX Ion Exchange Resins, Form No. 177-01775-1098QRP, 2 pages.

\* cited by examiner

TREATED ION EXCHANGE RESINS, METHOD OF MAKING, ASSEMBLIES AND HEAT TRANSFER SYSTEMS CONTAINING THE SAME, AND METHOD OF USE

This application claims the benefit of U.S. Provisional Application Ser. No. 60/607,974, filed on Sep. 8, 2004.

FIELD OF THE INVENTION

The invention relates to pre-treated ion exchange resins, especially corrosion inhibitor treated ion exchange resins and their use in heat transfer systems, alternative power sources such as fuel cells, and assemblies comprising such power sources.

BACKGROUND OF THE INVENTION

Heat transfer systems in thermal communication with a power source have been utilized to regulate heat generated during the operation of the power source. For example, automotive vehicles have employed heat transfer fluids and cooling systems that transfer and dissipate heat generated as a by-product of gasoline powered internal combustion engines. In this case, the heat transfer fluids and cooling systems ensure that the engine operates in an optimum environment and is not subject to undesirably high temperatures.

However, alternatives to traditional gasoline powered internal combustion engine are now desired, especially alternatives that address public concerns regarding the environment and the management of natural resources. As a result, new power source technologies continue to be developed, especially those that provide improvements in energy efficiency. Examples of alternative power sources that have been developed include, but are not limited to, batteries, fuel cells, solar (or photovoltaic) and internal combustion engines powered by the condensation of steam, natural gas, diesel, hydrogen, and/or the like. Such alternative power sources may be used alone or in combinations thereof, such as those employed in hybrid vehicles.

Although such alternative power sources often provide improvements in energy efficiency as compared to gasoline powered internal combustion engines, they continue to require the use of heat transfer systems and heat transfer fluids. In particular, heat transfer systems and fluids are necessary to maintain optimum operating conditions, particularly in regards to temperature.

Unfortunately, however, traditional prior art cooling systems and heat transfer fluids are unsuitable (or not optimized) for use with alternative power sources, especially those employing electricity or an electrical charge. For example, traditional prior art heat transfer fluids are typically characterized by extremely high conductivities, often in the range of 3000 µS/cm or more. The use of highly conductive heat transfer fluids with alternative power sources, especially electricity based alternative power sources, can result in electrical shock, increased corrosion and/or the short-circuiting of electrical current.

As a result, conventional heat transfer fluids are unsuitable for use with alternative power sources; especially electricity based alternative power sources.

Fuel cells are a particularly attractive alternative power source because of their clean and efficient operation. Fuel cells have been proposed for use in numerous applications.

For example, it has been proposed that fuel cells replace the internal combustion engines currently used in automobiles. Several different kinds of fuel cells are currently under development and appear to hold promise for use in automotive applications. Illustrative examples include Proton Exchange Membrane or Polymer Electrolyte Membrane (PEM) fuel cells, phosphoric acid (PA) fuel cells, molten carbonate (MC) fuel cells, solid oxide (SO) fuel cells, and alkaline fuel cells.

A fuel cell assembly typically comprises an anode, a cathode, and an electrolyte in between the two electrodes. Normally, an oxidation reaction (e.g., $H_2 \rightarrow 2H^+ + 2e$) takes place at the anode and a reduction reaction (e.g., $O_2 + 2H_2O + 4e \rightarrow 4OH^-$) takes place at the cathode. The electrochemical reactions that occur at the electrodes are exothermic, i.e., they produce heat.

The successful replacement of internal combustion engines with fuel cells requires that optimal operating conditions be achieved and maintained, i.e., a fuel cell must achieve the desirable current density level without degradation of fuel cell components. It is therefore necessary to control the exothermic heat produced during the electrochemical reactions.

For example, to achieve optimal operating conditions, the normal operating temperature of a PEM fuel cell assembly is controlled so that it remains within a range of from 60° C. to 95° C. Because of the exothermic nature of the electrochemical reactions, it is desirable to use a heat transfer fluid or heat transfer fluid to keep the electrode assembly at an operating temperature that is within the desired operating temperature range. However, the presence of an electrical charge makes it challenging to use fuel cells with prior art heat transfer systems and fluids.

Moreover, in order to produce sufficient power, a fuel cell based automotive engine might have many fuel cells connected together in series to form a fuel cell stack. Individual fuel cells may have an operating voltage of from 0.6 to 1.0V DC. In one instance, it is contemplated that anywhere from 100 to 600 individual fuel cells might be connected in series. As a result, the DC electrical voltage across automotive fuel cell stacks could be very high, typically ranging from 125 to 450 V DC.

These same voltages are experienced in the heat transfer fluid systems of the individual fuel cells used in automotive fuel cell stacks. To prevent or minimize electrical shock hazard, the heat transfer fluid must have very low conductivity. Low electrical conductivity for fuel cell heat transfer fluid is also desirable for the reduction of shunt current in the heat transfer fluid system and the minimization of system efficiency reduction.

There is therefore a need to provide 'low conductivity' heat transfer fluids intended for use in heat transfer systems that are in thermal communication with alternative power sources.

In addition to low electrical conductivity, heat transfer fluids used with alternative power sources must also have high heat capacity, low viscosity, and high thermal conductivity. Such properties help minimize pressure drops and reduce pumping power requirements while still meeting heat transfer requirements. Good surface wetting properties are also desirable in a heat transfer fluid employed with alternative power sources. A heat transfer fluid with good surface wetting characteristics is helpful in reducing pressure drops at a condition of constant flow rate.

Another important characteristic of a desirable heat transfer fluid is corrosion resistance. Many heat transfer fluid systems used with alternative power sources often have several metallic components. Illustrative metals found in heat transfer systems employed with alternative power sources include ferrous and non ferrous alloys such as stainless steel, aluminum, brass, braze alloy, and the like. However, such metals are vulnerable to corrosion as a result of contact with the heat transfer fluid.

There is therefore a need to provide corrosion inhibiting heat transfer fluids in heat transfer systems used with alternative power sources that minimize corrosion and prolong the service life of the heat transfer system. More particularly, there remains a need for low conductivity heat transfer fluids that inhibit the corrosion of heat transfer systems in thermal communication with alternative power sources.

Various methods for maintaining low electrical conductivity in a heat transfer fluid have been proposed. For example, WO 00/17951 proposes the use of an ion exchange resin unit to maintain adequate purity of a pure glycol and water heat transfer fluid mixture in a fuel cell system. CA 2 435 593 discloses a method for deionizing a heat transfer medium of a fuel cell utilizing a two heat transfer circuit arrangement and a deionization cell wherein a diluate flows in one heat transfer circuit flowing through a fuel cell stack and a concentrate flow can be part of a secondary heat transfer circuit.

Fuel cell coolants must also have high heat capacity, low viscosity, and high thermal conductivity. Such properties help minimize pressure drops and reduce pumping power requirements while still meeting heat transfer requirements. Good surface wetting properties are also desirable in a fuel cell coolant. A heat transfer fluid with good surface wetting characteristics is helpful in reducing pressure drops at a condition of constant flow rate.

Another important characteristic of a desirable heat transfer fluid is corrosion resistance. Heat transfer systems often have several metallic components. Illustrative metals found in fuel cell cooling systems and other heat transfer systems include ferrous and non ferrous alloys such as stainless steel, aluminum, brass, braze alloy, and the like. However, such metals are vulnerable to corrosion as a result of contact with the heat transfer fluid.

There is therefore a need to provide corrosion inhibiting heat transfer fluids that minimize corrosion of metallic heat transfer system components and prolong the service life of fuel cell cooling systems and other heat transfer systems.

However, many of the corrosion inhibitors previously known for use in internal combustion engine coolants are unsuitable for use in fuel cell heat transfer fluids because they are typically highly conductive ionic species. Illustrative examples of such corrosion inhibitors are silicates, nitrites, molybdates, nitrates, carboxylates, phosphates, borates, and the like. Such ionic corrosion inhibitors cannot be used in fuel cell heat transfer fluids because of the requirement that fuel cell heat transfer fluids have very low conductivity. One major drawback of ion exchange resins or electrodeionization cell methods is that they may remove corrosion inhibitors. As a result, the fuel cell heat transfer fluid may lose its ability to inhibit the corrosion of metal components of the fuel cell heat transfer system.

As a result, the prior art has failed to provide an effective resolution to problems associated with the maintenance of low conductivity in corrosion inhibiting heat transfer fluids for assemblies comprising alternative power sources such as fuel cells.

SUMMARY OF THE INVENTION

Disclosed are a pretreated ion exchange resin, a method of maintaining low conductivity in a heat transfer fluid, an assembly, a heat transfer system, a fuel cell system, a method of maintaining low conductivity in a corrosion inhibiting heat transfer fluid and a method of making a pretreated ion exchange resin.

In one embodiment, the pre-treated ion exchange resin comprises at least 15% by total number of exchangeable groups comprising at least one of an ion, a Lewis acid, or a Lewis base, resulting from a heat transfer fluid component having a $pK_a$ or $pK_b$ of greater than 5 in an aqueous solution at 25° C., based on the total number of exchangeable groups. Illustrative examples of suitable heat transfer fluid components include colorants, corrosion inhibitors, defoamers and/or anti-foaming agents, bitterants, dispersants, or a combination thereof. In one embodiment, suitable heat transfer fluid components will have a $pK_a$ or $pK_b$ of from 5 to 14 in an aqueous solution at 25° C.

In one particularly disclosed embodiment, the heat transfer fluid component will be a corrosion inhibitor. Thus, a corrosion inhibitor treated ion exchange resin is disclosed that comprises at least 15% of exchangeable groups comprising a corrosion inhibitor, based on the total number of exchangeable groups.

The disclosed assembly is powered by an alternative power source and comprises an alternative power source and a heat transfer system in thermal communication with the alternative power source, the heat transfer system comprising a circulation loop defining a flow path for a heat transfer fluid having a conductivity of less than 200 μS/cm, and an ion exchange resin positioned in the flow path, the ion exchange resin comprising ion exchangeable groups, wherein at least 15% of the total ion exchangeable groups comprise either an ion, or a Lewis acid, or a Lewis base resulting from a heat transfer fluid component having a $pK_a$ or $pK_b$ of greater than 5 in an aqueous solution at 25° C., based on the total number of exchangeable groups. In one exemplary embodiment, the alternative power source is a fuel cell.

The disclosed heat transfer system comprises a circulation loop defining a flow path for a heat transfer fluid having a conductivity of less than 200 μS/cm, and an ion exchange resin positioned in the flow path, the ion exchange resin having at least 15% of exchangeable groups comprising either an ion, or a Lewis acid, or a Lewis base resulting from a heat transfer fluid component having a $pK_a$ or $pK_b$ of greater than 5 in an aqueous solution at 25° C., based on the total number of exchangeable groups.

The disclosed method of maintaining a conductivity of less than 200 μS/cm in a corrosion inhibiting heat transfer fluid comprises passing a heat transfer fluid through a heat transfer system, wherein the heat transfer fluid has a conductivity of less than 200 μS/cm and the heat transfer system comprises a circulation loop defining a flow path for the heat transfer fluid, and an ion exchange resin positioned in the flow path, the ion exchange resin comprising at least 15% of exchangeable groups comprising either an ion, or a Lewis acid, or a Lewis base resulting from a heat transfer fluid component having a $pK_a$ or $pK_b$ of greater than 5 in an aqueous solution at 25° C., based on the total number of exchangeable groups. In one embodiment, the heat transfer fluid component is at least one of a colorant, a corrosion inhibitor, an anti-foaming agent, a bitterant, a dispersant, or a combination thereof. In one exemplary embodiment, the heat transfer fluid component comprises a heat transfer fluid corrosion inhibitor.

Also disclosed is a method of making a treated ion exchange resin, comprising contacting an ion exchange resin with an aqueous treatment solution comprising a heat transfer fluid component having a $pK_a$ or $pK_b$ of greater than 5 in an aqueous solution at 25° C., for a period of time sufficient to exchange at least 15% of the exchangeable sites with the heat transfer fluid component. In one embodiment, the heat transfer fluid component is at least one of a colorant, a corrosion inhibitor, a bitterant, a dispersant, or a combination thereof. In one exemplary embodiment, the heat transfer fluid component comprises a heat transfer fluid corrosion inhibitor.

Also disclosed is a fuel cell system, comprising at least one fuel cell comprising an anode, a cathode, and an electrolyte; and a heat transfer system in thermal communication with the at least one fuel cell, comprising a circulation loop defining a flow path for a heat transfer fluid having a conductivity of less than 200 µS/cm, and an ion exchange resin positioned in the flow path, the ion exchange resin comprising at least 15% by total number of exchangeable groups comprising either an ion, or a Lewis acid, or a Lewis base resulting from a heat transfer fluid component having a $pK_a$ or $pK_b$ of greater than 5 in an aqueous solution at 25° C., based on the total number of exchangeable groups. In one embodiment, the heat transfer fluid component is at least one of a colorant, a corrosion inhibitor, an anti-foaming agent, a bitterant, a dispersant, or a combination thereof. In one exemplary embodiment, the heat transfer fluid component comprises a heat transfer fluid corrosion inhibitor.

DETAILED DESCRIPTION OF PREFERRED EMBODIMENTS

Figure 1:
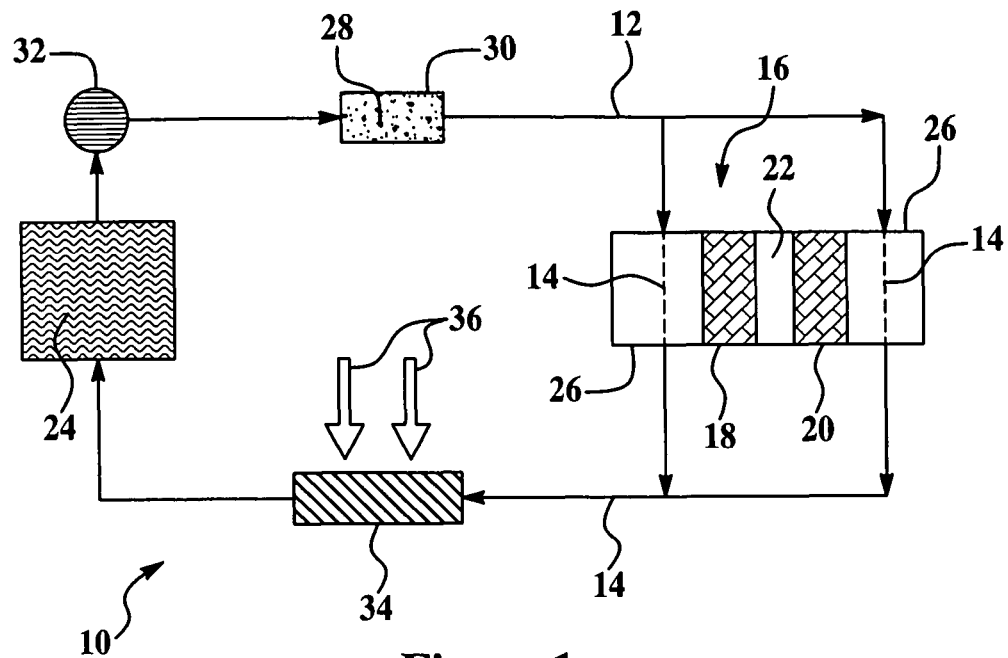
FIG. 1 is a schematic diagram of one embodiment of the disclosed heat transfer system and fuel cell system.
Figure 2:
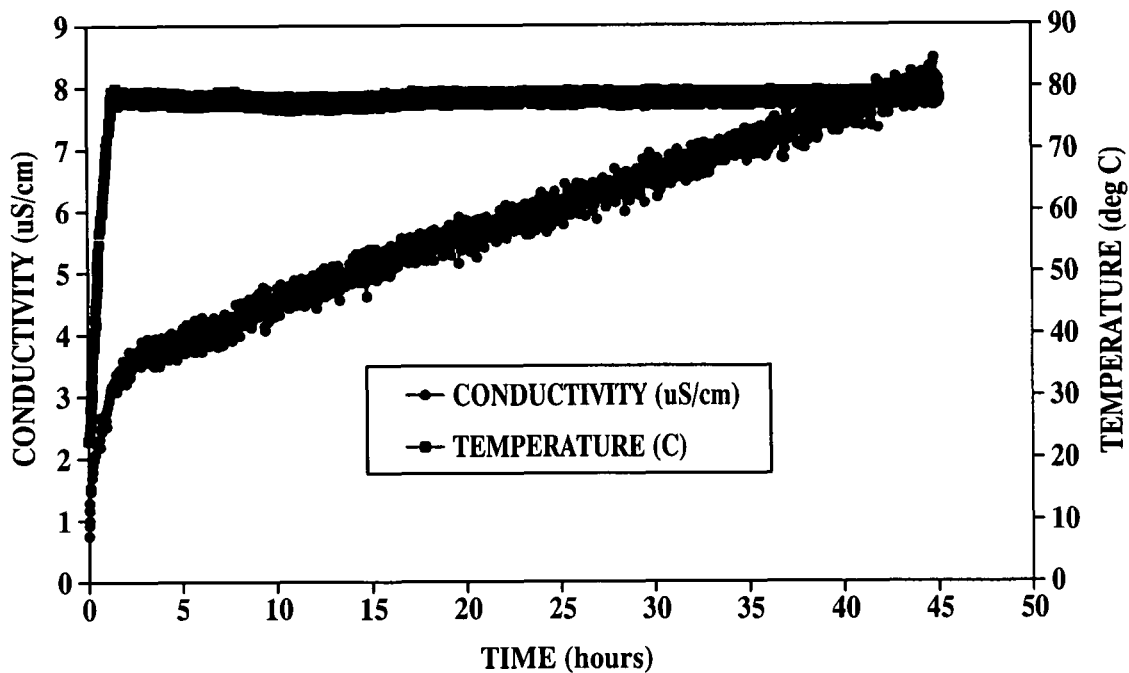
FIG. 2 is a graph illustrating experimental results, showing the measured heat transfer fluid conductivity versus time in a simulated fuel cell cooling system test without the presence of ion exchange resin.
Figure 3:
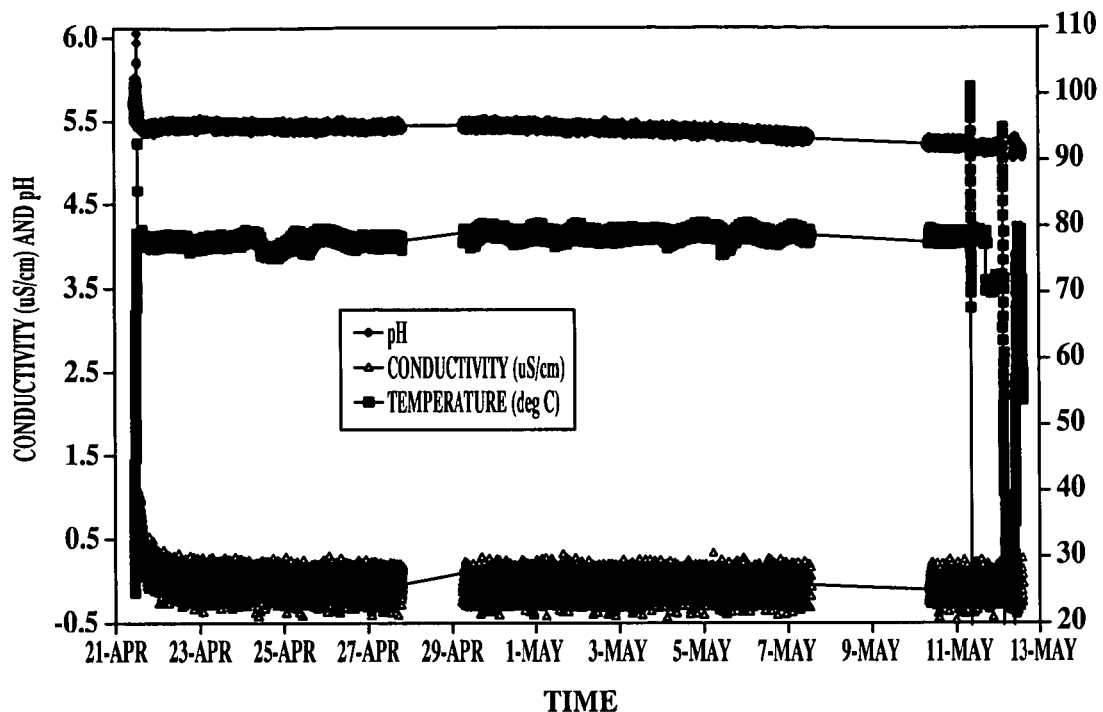
FIG. 3 is graph illustrating experimental results of another example, showing the measured heater transfer fluid conductivity versus time in a simulated fuel cell cooling system test, where a filter containing 150 g Amberlite MB-150 mixed bed resin in the flow loop was used.
Figure 4:
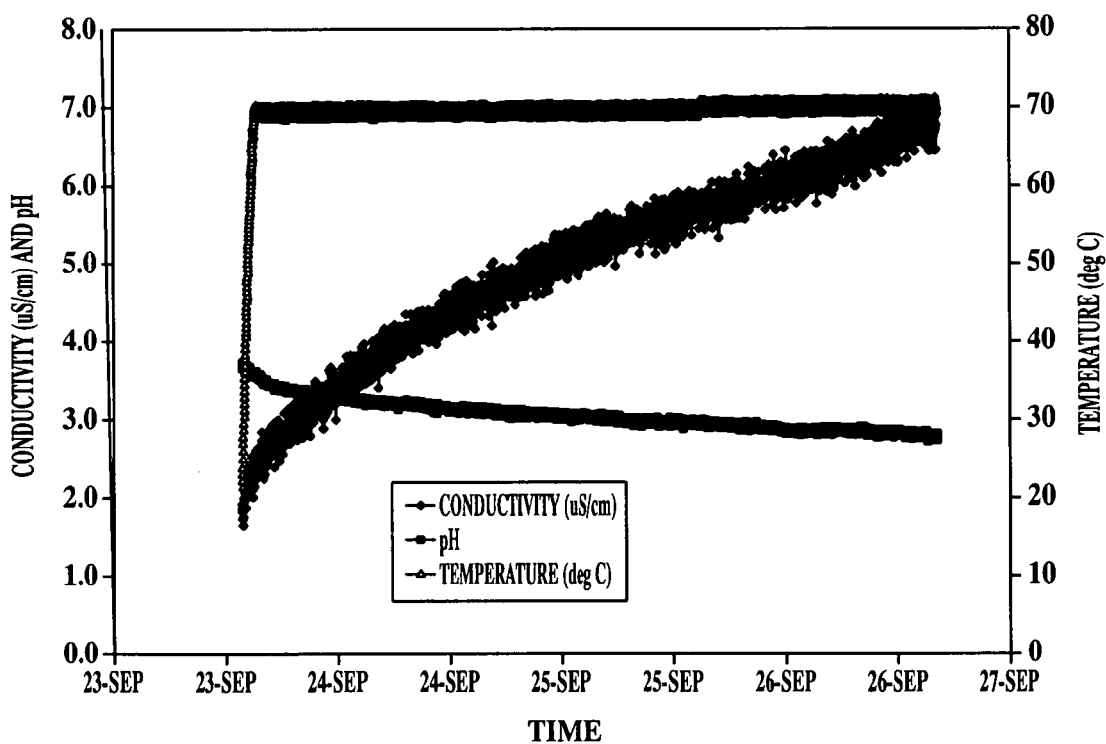
FIG. 4 is graph illustrating experimental results of another example, showing the measured conductivity versus time in a simulated fuel cell cooling system test, where a filter containing 60 g Dow strong acid cation ion exchange resin in the flow loop was used.
Figure 5:
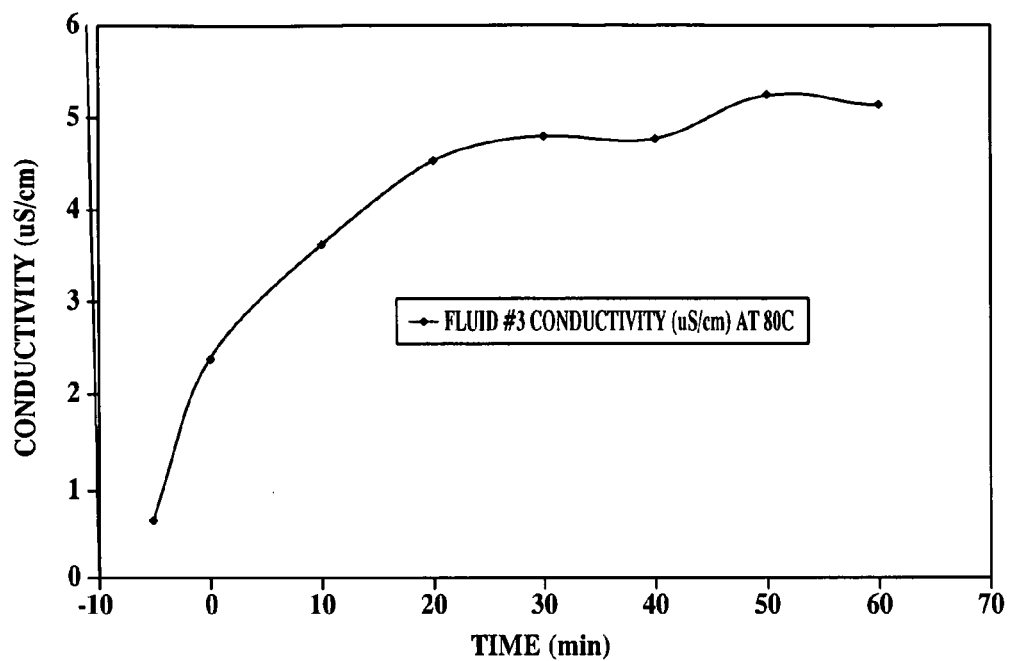
FIG. 5 is graph illustrating experimental results of another example, showing that the measured conductivity versus time in a beaker test, where 0.6 g of a SYBRON strong base anion resin was added into 100 g of a heat transfer fluid for fuel cell cooling system.

The disclosed heat transfer fluids are suitable for use in assemblies comprising alternative power sources, especially fuel cells, and may be characterized as having very low conductivity.

The term 'heat transfer fluid' as used herein refers to a fluid that is capable of transferring and dissipating a quantity of thermal energy from a first point to a second point. In one embodiment, the disclosed heat transfer fluids may be referred to as coolants. In another embodiment, the disclosed heat transfer fluids may also be referred to as antifreeze, due to the ability of some heat transfer fluids to function as freezing point depressants.

'Heat transfer fluid' as used herein also refers to both concentrated solutions of the corrosion inhibitor and alcohol or water/alcohol mixtures as well as to diluted solutions of the same mixed with water, preferably deionized water. It will be appreciated that although heat transfer fluid may be purchased, transported or used in concentrated solutions consisting mainly of one or more alcohols and corrosion inhibitor, such concentrates will often be diluted with water, especially deionized water, prior to incorporation or use in a fuel cell. Dilution ratios of from 1:3 to 3:1 (DI water: Heat transfer fluid) are typical, with ratios of from 40%:60% to 60%:40% being used in one exemplary embodiment. Thus, the term 'heat transfer fluid' as used herein refers to both concentrated solutions and dilute solutions of the disclosed heat transfer fluids.

The term 'low conductivity' as used herein generally refers to electrical conductivities of no more than 200 µS/cm. In one embodiment, suitable heat transfer fluids will have a conductivity of less than 150 µS/cm, while in another embodiment, the suitable heat transfer fluids will have a conductivity of less than 50 µS/cm.

In other embodiments, suitable heat transfer fluids will have an electrical conductivity of from 0.02 µS/cm to no more than 200 µS/cm. In one embodiment, the disclosed heat transfer fluids for use in fuel cells will have a conductivity of from 0.2 µS/cm to 100 µS/cm. In another embodiment, the disclosed heat transfer fluids will have a conductivity of from 0.05 to less than 50 µS/cm, while in one exemplary embodiment, the disclosed heat transfer fluids will have a conductivity of from 0.05 to no more than 25 µS/cm. In an especially exemplary embodiment, the disclosed heat transfer fluids will have an electrical conductivity of from 0.05 to no more than 10 µS/cm. In one especially exemplary embodiment, the disclosed heat transfer fluids will have an electrical conductivity of from 0.05 to no more than 5 µS/cm.

The electrical conductivity of the disclosed heat transfer fluids may be measured by using the test methods described in ASTM D1125, i.e., "Standard Test Methods for Electrical Conductivity and Resistivity of Water" or an equivalent method.

A 'corrosion inhibiting heat transfer fluid' as used herein refers to a heat transfer fluid having a sufficient amount of one or more corrosion inhibitors such that metallic components immersed in said fluid have a reduced rate of corrosion relative to their corrosion in a heat transfer fluid that is identical in all respects except that it lacks any corrosion inhibitors.

Disclosed in one embodiment is a pre-treated ion exchange resin, a heat transfer system using said pre-treated ion exchange resin, an assembly using said heat transfer system, a fuel cell system using said heat transfer system and a method of using said pre-treated ion exchange resin to maintain low conductivity in a heat transfer fluid.

Disclosed in another embodiment is a corrosion inhibitor treated ion exchange resin, a heat transfer system using said resin, an assembly using said heat transfer system, a fuel cell system using said heat transfer system, and a method of maintaining low conductivity in a corrosion inhibiting fuel cell heat transfer fluid.

In one embodiment, the disclosed pre-treated ion exchange resin comprises at least 15% by total number of exchangeable groups comprising either an ion, or a Lewis acid, or a Lewis base resulting from a heat transfer fluid component having a $pK_a$ or $pK_b$ of greater than 5 in an aqueous solution at 25° C., based on the total number of exchangeable groups.

Suitable heat transfer fluid components that may be used to make the pre-treated resin include all components of a heat transfer fluid or heat transfer liquid that form a ionic species in an aqueous solution at 25° C. In one embodiment, suitable heat transfer fluid components will have a $pK_a$ or $pK_b$ of from 5 to 14 in an aqueous solution at 25° C. In one exemplary embodiment, suitable heat transfer fluid components will have a $pK_a$ or $pK_b$ of from 5 to less than 14 in an aqueous solution at 25° C.

Illustrative examples of suitable heat transfer fluid components include colorants, corrosion inhibitors, antifoaming agents, bitterants, dispersants, or a combination thereof. In one embodiment, the heat transfer fluid component present in the pre-treated resin will be at least one of a corrosion inhibitor, a colorant, or a combination thereof. In one exemplary embodiment, the heat transfer fluid component present in the pre-treated resin will be a corrosion inhibitor.

In one embodiment, a pre-treated ion exchange resin such as a corrosion inhibitor treated ion exchange resin results from the pretreatment of ion exchange resins with one or more treatment heat transfer fluid components as described above. In one exemplary embodiment, the heat transfer fluid component is a treatment corrosion inhibitor.

In one embodiment, the disclosed corrosion inhibitor treated ion exchange resins may be made by contacting an ion exchange resin with an aqueous treatment solution containing one or more treatment components such as corrosion inhibitors. The treatment results in the exchange of a treatment component such as an inhibitor with at least some of the exchangeable groups in the ion exchangeable resin.

Illustrative examples of suitable ion exchange resins include anion exchange resins, cation exchange resins, mixed bed ion exchange resins, and mixtures thereof. The particular ion exchange resin selected is dependent upon the type of heat transfer fluid component used in the heat transfer fluid. For example, in one embodiment, the particular ion exchange resin selected is dependent upon the type of corrosion inhibitor used in the heat transfer fluid. Although 'corrosion inhibitor' is used in the discussion below, it will be appreciated that it is merely illustrative of one type of heat transfer fluid component suitable for use in making and obtaining a treated ion exchange resin.

The ion exchange resins suitable for use in making any of the pre-treated ion exchange resins disclosed herein will generally have a polymer matrix and functional groups 'paired' with an exchangeable ion form.

The exchangeable ion form is generally one or more of Na+, H+, OH⁻, or Cl⁻ ions, depending on the type of ion exchangeable resin. These exchangeable ions exchange with the ionic species produced by the one or more corrosion inhibitors present in an aqueous corrosion inhibitor treatment solution. These exchangeable ions exchange with any ionic species produced by the one or more corrosion inhibitors present in an aqueous inhibitor treatment solution and in some cases with the ionic inhibitor species present in a corrosion inhibiting fuel cell heat transfer fluid.

For example, if a heat transfer fluid component such as a corrosion inhibitor becomes a negatively charged species in solution, i.e., for example if N-heterocyclic compounds are used as a corrosion inhibitor, the ion exchange resin should be a mixed bed resin, an anion exchange resin, or a mixture thereof. Commercially available anion exchange resins are typically in either OH⁻ or Cl⁻ forms. In one exemplary embodiment, a selected anion exchange resin will be in the OH⁻ form.

Alternatively, if a heat transfer fluid component such as a corrosion inhibitor in a corrosion inhibiting heat transfer fluid becomes a positively charged species in solution, then mixed bed resins, cation exchange resins or a mixture thereof should be used. Commercially available cation exchange resins are typically in either H⁺ or Na⁺ forms. In one exemplary embodiment, a selected cation exchange resin will be in the H⁺ form.

In one embodiment, ion exchange resins in Na⁺ or Cl⁻ forms will be used only if the treatment with an aqueous component solution such as an aqueous corrosion inhibitor solution results in the removal of substantially all of the Na⁺ or Cl⁻ ions from the ion exchange resin. For example, in one exemplary embodiment, ion exchange resins in Na+ or Cl⁻ forms will be used only if the treatment with the aqueous component solution results in the production of a corrosion inhibitor treated ion exchange resin having at least 90% of exchangeable groups comprising a suitable heat transfer fluid component such as a corrosion inhibitor.

Examples of illustrative polymer matrices include polystyrene, polystyrene and styrene copolymers, polyacrylate, aromatic substituted vinyl copolymers, polymethacrylate, phenol-formaldehyde, polyalkylamine, combinations thereof, and the like. In one embodiment, the polymer matrix will be polystyrene and styrene copolymers, polyacrylate, or polymethacrylate, while in one exemplary embodiment; the polymer matrix will be styrene divinylbenzene copolymers.

Examples of illustrative functional groups in cation ion exchange resins include sulfonic acid groups (—$SO_3H$), phosphonic acid groups (—$PO_3H$), phosphinic acid groups (—$PO_2H$), carboxylic acid groups (—COOH or —C($CH_3$)—COOH), combinations thereof, and the like. In one embodiment, the functional groups in a cation exchange resin will be —$SO_3H$, —$PO_3H$, or —COOH, while in one exemplary embodiment; the functional groups in a cation exchange resin will be —$SO_3H$.

Examples of illustrative functional groups in anion exchange resins include quaternary ammonium groups, e.g., benzyltrimethylammonium groups (also termed type 1 resins), benzyldimethylethanolammonium groups (also termed type 2 resins), trialkylbenzyl ammonium groups (also termed type 1 resins); or tertiary amine functional groups, and the like. In one embodiment, the functional groups in an anion exchange resin will be trialkylbenzyl ammonium, trimethylbenzyl ammonium, or dimethyl-2-hydroxyethylbenzyl ammonium, while in one exemplary embodiment; the functional groups in an anion exchange resin will be trialkylbenzyl ammonium.

Commercially available ion exchange resins suitable for use herein are available from Rohm & Haas of Philadelphia, Pa. as Amberlite™, Amberjet™, Duolite™, and Imac™ resins, from Bayer of Leverkusen, Germany as Lewatit™ resin, from Dow Chemical of Midland, Mich. as Dowex™ resin, from Mitsubishi Chemical of Tokyo, Japan as Diaion™ and Relite™ resins, from Purolite of Bala Cynwyd, Pa. as Purolite™ resin, from Sybron of Birmingham, N.J. as Ionac™ resin, from Resintech of West Berlin, N.J., and the like. In one embodiment, a suitable commercially available ion exchange resin will be Dowex™ MR-3 LC NG Mix mixed bed resin, Dowex™ MR-450 UPW mixed bed resin, Sybron Ionac™ NM-60 mixed bed resin, or Amberlite™ MB-150 mixed bed resin, while in one exemplary embodiment, a suitable commercially available ion exchange resin will be Dowex™ MR-3 LC NG Mix.

The ion exchange resin is contacted with an aqueous treatment solution comprising a suitable heat transfer fluid component such as a corrosion inhibitor. It will be appreciated that other components such as described herein are also suitable for use. A suitable heat transfer fluid component may be referred to as a 'treatment component'.

Suitable heat transfer fluid components that may be used to make the pre-treated resin include all components of a heat transfer fluid or heat transfer liquid that form either an ionic species or a Lewis acid or a Lewis base in an aqueous solution at 25° C. In one embodiment, suitable heat transfer fluid components will have a $pK_a$ or $pK_b$ of from 5 to 14 in an aqueous solution at 25° C. In one exemplary embodiment, suitable heat transfer fluid components will have a $pK_a$ or $pK_b$ of from 5 to less than 14 in an aqueous solution at 25° C.

One example of a suitable treatment heat transfer fluid component is a 'treatment corrosion inhibitor' or 'treatment inhibitor'. Suitable treatment inhibitors for use in the aqueous treatment solution of inhibitor include weakly ionic corrosion inhibitors that are soluble or dispersible in an alcohol or in a mixture of one or more alcohols and water.

Corrosion inhibitors suitable for use as treatment inhibitors in one embodiment will have a $pK_a$ value of equal to or greater than 5 if it is an acid in an aqueous solution at 25° C. In one exemplary embodiment, suitable treatment inhibitors will have a $pK_a$ value of from 5 to 14. In one especially exemplary embodiment, suitable acid treatment inhibitors will have a $pK_a$ value of from 5 to less than 14.

If a treatment inhibitor is a base, the $pK_b$ value of suitable treatment inhibitors should be equal to or greater than 5 in an aqueous solution at 25° C. In one exemplary embodiment, suitable basic treatment inhibitors will have a $pK_b$ value of from 5 to 14. In one especially exemplary embodiment, a suitable basic treatment inhibitor will have a $pK_b$ value of from 5 to less than 14.

In one exemplary embodiment, suitable treatment inhibitors will possess good stability in a mixture of alcohol and water under fuel cell operating conditions, i.e., typically temperatures of from about 40° C. to about 100° C.

In one embodiment, a treatment component such as a treatment inhibitor will comprise at least some minimum number of functional groups that will form an ionic species due to hydrolysis in an aqueous alcohol or alkylene glycol solution. In one embodiment, the treatment inhibitor may comprise from 1 to 10 number of ionic forming functional group per molecule, more preferably from 1 to 5 per molecule of treatment inhibitor. Illustrative ionic forming functional groups are those selected from the group consisting of amine groups, heterocyclic aromatic groups, and other N-containing groups, and phenol or naphthol derivatives.

In one embodiment, the treatment inhibitor will comprise an azole compound.

Suitable azole compounds are five-membered heterocyclic compounds having 1 to 4 nitrogen atoms. Illustrative examples include imidazoles, triazoles, thiazoles and tetrazoles of the formulas (I), (II), (III) and (IV) below, such as benzotriazole, tolytriazole, alkyl benzotriazoles, such as 4-methyl benzotriazole, 5-methyl benzotriazole, and butyl benzotriazole and the like, benzimidazole, halobenzotriazoles, such as chloro-methylbenzotriazole, tetrazole, substituted tetrazoles, thiazoles, such as 2-mercaptobenzothiazole, and the like.

In one embodiment, the azole compound will be of the formula (I), (II), (III) or (IV):

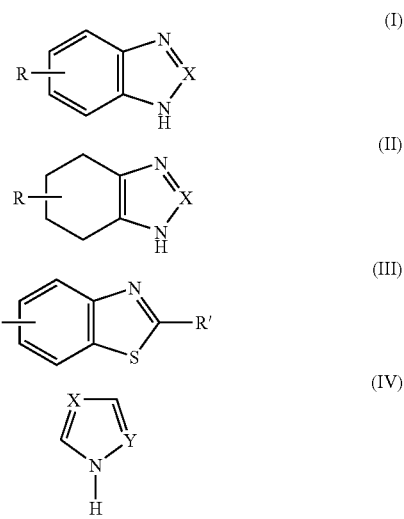

wherein R is hydrogen or halogen such as Cl or Br, or a $C_1$ to $C_{20}$ alkyl group; R' is at least one of hydrogen, $C_1$ to $C_{20}$ alkyl group, or SH or SR group; and X is N, C—SH or CH; and Y is selected from N, C—R or CH group, and R is defined as above. In one exemplary embodiment, the azole compound will be of formula (I) wherein X is N. In one particularly exemplary embodiment, the azole compound will be of formula (I) wherein X is N and R is hydrogen or an alkyl group of from 1 to less than 10 carbons.

As used herein, the term "alkyl" includes both branched and straight chain saturated aliphatic hydrocarbon groups, having the specified number of carbon atoms. The term $C_1$-$C_7$ alkyl as used herein indicates an alkyl group having from 1 to about 7 carbon atoms. When $C_0$-$C_n$ alkyl is used herein in conjunction with another group, for example, heterocycloalkyl($C_0$-$C_2$ alkyl), the indicated group, in this case heterocycloalkyl, is either directly bound by a single covalent bond ($C_0$), or attached by an alkyl chain having the specified number of carbon atoms, in this case from 1 to about 2 carbon atoms. Examples of alkyl include, but are not limited to, methyl, ethyl, n-propyl, isopropyl, n-butyl, 3-methylbutyl, t-butyl, n-pentyl, and sec-pentyl.

Illustrative examples of suitable azole compounds include benzotriazole, tolytriazole, methyl benzotriazole, i.e., 4-methyl benzotriazole and 5-methyl benzotriazole, butyl benzotriazole, mercaptobenzothiazole, benzimidazole, halobenzotriazoles, such as chloro-methylbenzotriazoles, and the like. In one embodiment, the azole compound will be one of benzotriazole, tolytriazole, or mercaptobenzothiazole, while in one exemplary embodiment; the azole compound will be benzotriazole.

The aqueous inhibitor solution used to make the corrosion inhibitor treated ion exchange resins will generally have a concentration of treatment inhibitor as described above of at least 1000 ppm at a temperature of greater than ~2 degrees C. In one embodiment, the aqueous inhibitor solution will have a concentration of from 0.001% to 90% by weight, while in another embodiment; the aqueous inhibitor solution will have a concentration of from 0.005% to 10% by weight.

In one exemplary embodiment, the aqueous inhibitor solutions will be made with deionized water.

In one embodiment, the ion exchange resin is contacted with the aqueous component solution for a period of time sufficient to allow the treatment component such as a treatment inhibitor to exchange places with at least 15% of the total exchangeable groups, based on the total number of exchangeable ions in the ion exchange resin. That is, in one embodiment, the inhibitor loading of the corrosion inhibitor treated ion exchange resin should be at least 15% of the exchange capacity of the ion exchange resin. In another embodiment, the period of contact is sufficient to allow the treatment inhibitor to exchange places with at least 50% of the total exchangeable groups, based on the total number of exchangeable ions in the ion exchange resin. In one exemplary embodiment, the period of contact is sufficient to allow the treatment inhibitor to exchange places with at least 75% of the total exchangeable groups, based on the total number of exchangeable ions in the ion exchange resin. In another exemplary embodiment, the period of contact is sufficient to allow the corrosion inhibitor loading to be an amount of from 15 to 99% of the total exchange capacity of the resin or from 15 to 99% of the total exchangeable groups, based on the total number of exchangeable ions in the ion exchange resin.

The resultant pre-treated ion exchange resins, and in one exemplary embodiment, the corrosion inhibitor treated ion exchange resins, will be cleansed with de-ionized water and/or clean fuel cell heat transfer fluid to minimize the chance for accidental introduction of impurities.

In one embodiment, the disclosed pre-treated ion exchange resins will be used in a heat transfer system, especially a fuel cell heat transfer system. However, it will be appreciated that the disclosed pre-treated ion exchange resins and heat transfer fluids passing through such resins to maintain low conductivity may be used in applications other than fuel cells that require a heat transfer liquid.

Particularly suitable applications are those having heat transfer systems that require heat transfer fluids having low conductivity. Illustrative examples include glass and metal manufacturing processes where a high electrical voltage/current is applied to the electrodes used to keep a material such as glass or steel in a molten state. Such processes typically require a heat transfer fluid having low conductivity to cool the electrodes. The pre-treated ion exchange resins disclosed herein are suitable for use in such heat transfer systems.

In one exemplary embodiment, the disclosed corrosion inhibitor treated ion exchange resin will be used in a fuel cell heat transfer system. In one exemplary embodiment illustrated in FIG. 1, a suitable fuel cell heat transfer system 10 will comprise a circulation loop 12 that defines a flow path 14 that is in thermal communication with at least one fuel cell 16 comprising an anode 18, a cathode 20, and an electrolyte 22. The term 'thermal communication' as used herein refers to any arrangement that allows heat produced by the exothermic reaction in the fuel cell 16 to be transferred to the corrosion inhibiting heat transfer fluid by heat transfer.

For example, in one embodiment as illustrated in FIG. 1, the flow path 14 will pass through a heat transfer fluid channel 26 in the fuel cell 16. A corrosion inhibitor treated ion exchange resin 28 is placed in flow path 14 so that corrosion inhibiting heat transfer fluid 24 must pass through there. In one embodiment, a corrosion inhibitor treated ion exchange resin 28 may be placed in a filter 30 that is placed in the flow path 14 of a circulation loop 12.

It will be appreciated that numerous configurations for circulation loop 12 are within the scope of the instant disclosures. For example, the heat transfer fluid channel 26 may be comprised of multiple channels or may be configured to wrap around the fuel cell 16. In general, the heat transfer fluid channels should be in close proximity to the electrode assembly surfaces where oxidation reaction of the fuel(s) and/or the reduction reaction of the oxidant(s) are taking place, so that effective heat transfer between heat transfer fluid and the electrode assembly can be accomplished. In addition, the heat transfer fluid channels and the fuel and oxidant flow channels are generally mechanically isolated from each other, so that undesirable interference among fuel, oxidant and heat transfer fluid will not occur.

It will be appreciated that the disclosed treated ion exchange resins and/or heat transfer fluids may be used in a variety of assemblies comprising one or more alternative power sources. The term 'alternative power source' as used here refers to power source technologies that provide improvements in energy efficiency, environmental concerns, waste production and management issues, natural resource management, and the like. Examples of alternative power sources that have been developed include, but are not limited to, batteries, fuel cells, solar cells or solar panels, photovoltaic cells, and internal combustion engines powered by the condensation of steam, natural gas, diesel, hydrogen, and/or the like. In one embodiment, the term 'alternative power source' includes devices powered by internal combustion engines operating with a clean heat transfer system, i.e., a heat transfer system that does not contribute to the concentration of ionic species in the heat transfer fluid. Such alternative power sources may be used alone or in combinations thereof, such as those employed in hybrid vehicles.

It will be appreciated that assemblies comprising such alternative power sources may include any article traditionally powered by an internal combustion engine, such as automotive vehicles, boats, generators, lights, aircrafts and airplanes, trains or locomotives, military transport vehicles, stationary engines, and the like. The assemblies also include additional systems or devices required for the proper utilization of alternative power sources, such as electric motors, DC/DC converters, DC/AC inverters, electric generators, and other power electronic devices, and the like. The assemblies may also include systems or devices required for the proper utilization of the alternative power sources such as electric motors, DC/CC converters, DC/AC inverters, electric generators, and other power electronics and electrical devices, and the like.

The disclosed assemblies will generally comprise an alternative power source and a heat transfer system in thermal communication with the alternative power source. In one embodiment, the heat transfer system will comprise a circulation loop defining a flow path for a corrosion inhibiting heat transfer fluid having a conductivity of less than 200 µS/cm. In one exemplary embodiment, the heat transfer system will comprise a circulation loop defining a flow path for a corrosion inhibiting liquid heat transfer fluid having a conductivity of less than 200 µS/cm and comprising a corrosion inhibitor comprising an azole compound, and at least one of a siloxane based surfactant, colloidal silica, or mixtures thereof.

Figure 8:
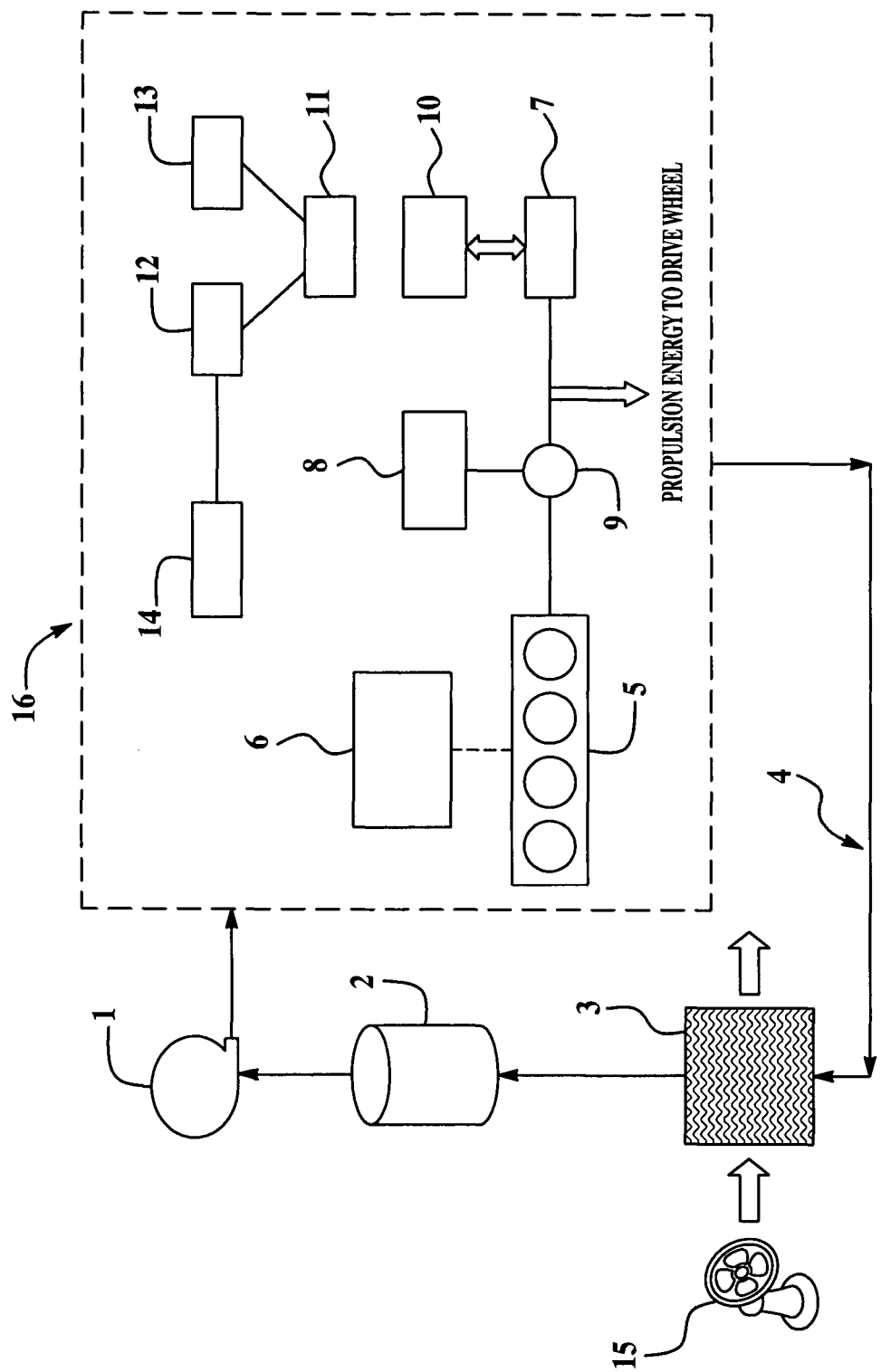
FIG. 8 is a schematic diagram of an illustrative assembly comprising an alternative power source and a heat transfer system, more particularly a hybrid vehicle cooling system.

As illustrative example of the disclosed assembly may be seen in FIG. 8. The major components of the cooling system, and the main system components 16 that may require the use of coolant or heat transfer fluid as cooling media are shown in the figure. As indicated therein, the assembly may contain internal combustion engine 5, or fuel cells 5 or solar cells 5 as the vehicle primary power source 7. It also contains a rechargeable secondary battery 12 or an optional ultra-capacitor 13 that may be charged via the vehicle regenerative braking system. In this embodiment, the battery 12 and/or the ultra-capacitor 13 may act as secondary power sources. The assembly may also contain power electronic devices, such as DC/DC converters 10, DC/AC inverters 10, generators 8, power splitting devices 9, and/or voltage boost converters 11, etc. In addition, the assembly may also contain fuel cell or solar cell "balance of plant" subsystems 6. These may be air compressors, pumps, power regulators, etc. The assembly also contain HAVC systems 14, e.g., air-conditioning system for the climate control of vehicle interior space. These are included in the vehicle system 16 in the illustrated assembly of FIG. 8 that may require the use of coolant or heat transfer fluid for temperature control. Similar to other vehicle cooling systems, the assembly in the illustrative example also contains a coolant recirculation pump 1, coolant flow path 4, coolant tank 2, and a radiator or heat exchanger 3, and a fan 15. The fan may be substituted by an external cooling source, e.g., a different (or isolated) cooling system with its own cooling media.

In one embodiment, the alternative power source will be a fuel cell. It will be appreciated that a fuel cell is in thermal communication with the disclosed heat transfer systems and fluids, the electrical conductivity of the disclosed heat transfer fluids will be, in one embodiment, no more than 10 μS/cm. In an especially exemplary embodiment comprising a fuel cell, the disclosed heat transfer fluids will have an electrical conductivity of from 0.02 to no more than 10 μS/cm. In one especially exemplary embodiment, the disclosed corrosion inhibiting heat transfer fluids will have an electrical conductivity of from 0.05 to no more than 5 μS/cm.

The disclosed corrosion inhibiting heat transfer fluids may be used in a number of different types of fuel cells comprising an electrode assembly comprising an anode, a cathode, and an electrolyte, and a heat transfer fluid in thermal communication with the electrode assembly or fuel cell. In one embodiment the heat transfer fluid may be contained or flow in a channel or flow path defined by a circulation loop or heat transfer fluid flow channel in thermal communication with said fuel cell.

Illustrative types of suitable fuel cells include PEM (Proton Exchange Membrane or Polymer Electrolyte Membrane) fuel cells, AFC (alkaline fuel cell), PAFC (phosphoric acid fuel cell), MCFC (molten carbonate fuel cell), SOFC (solid oxide fuel cell), and the like. In one exemplary embodiment, the disclosed corrosion inhibiting heat transfer fluids will be used in PEM and AFC fuel cells.

In one embodiment, the disclosed heat transfer systems, assemblies, and fuel cell systems will employ suitable heat transfer fluids that may be characterized as having very low conductivity as defined above.

In one embodiment, suitable heat transfer fluids will comprise a heat transfer fluid inhibitor as described herein. In another embodiment, suitable heat transfer fluids will comprise at least one alcohol in addition to the heat transfer fluid inhibitor. In one exemplary embodiment, the corrosion inhibiting fuel cell heat transfer fluids will comprise a corrosion inhibitor, at least one alcohol, and water. In another exemplary embodiment, the corrosion inhibiting fuel cell heat transfer fluids will comprise a corrosion inhibitor as disclosed herein, water, at least one alcohol, a colorant, and optionally one or more additives such as an antifoam agent, a bittering agent, a wetting agent, a non-ionic dispersant and the like.

As discussed above, in one exemplary embodiment, the heat transfer fluid used in the disclosed heat transfer systems, assemblies, and fuel cell systems will be a corrosion inhibiting heat transfer fluid that comprises at least one corrosion inhibitor. The corrosion inhibitor used in the corrosion inhibiting heat transfer fluid, i.e., a 'heat transfer fluid inhibitor' may be the same or different with respect to the 'treatment inhibitor' used in the aqueous treatment solution as described above.

In one embodiment, the heat transfer fluid component used in the treatment solution will also be present as a component of the heat transfer fluid. However, in one exemplary embodiment, additional components will be present as part of the heat transfer fluid.

In one embodiment, at least one treatment inhibitor present in a corrosion inhibitor treated ion exchange resin will be the same as at least one heat transfer fluid corrosion inhibitor used in a corrosion inhibiting heat transfer fluid. In another embodiment, at least one treatment inhibitor present in a corrosion inhibitor treated ion exchange resin will be the same as at least one heat transfer fluid inhibitor used in a corrosion inhibiting heat transfer fluid that is used in a heat transfer system employing said corrosion inhibitor treated ion exchange resin. In one exemplary embodiment, the treatment inhibitors present in a corrosion inhibitor treated ion exchange resin will be the same as the heat transfer fluid inhibitors used in a heat transfer fluid used in a heat transfer system employing said corrosion inhibitor treated ion exchange resin.

In one exemplary embodiment, the corrosion inhibitor used in the treatment solution will also be present as the corrosion inhibitor of the heat transfer fluid. However, in one exemplary embodiment, additional components will be present as part of the heat transfer fluid corrosion inhibitor. In one particularly exemplary embodiment, the heat transfer fluid inhibitor will comprise an azole compound and at least one of at least one of a siloxane based surfactant, colloidal silica or a mixture thereof.

Suitable azole compounds are five-membered heterocyclic compounds having 1 to 4 nitrogen atoms. Illustrative examples include imidazoles, triazoles, thiazoles and tetrazoles of the formulas (I), (II), (III) and (IV) below, such as benzotriazole, tolytriazole, alkyl benzotriazoles, such as 4-methyl benzotriazole, 5-methyl benzotriazole, and butyl benzotriazole and the like, benzimidazole, halbenzotriazoles, such as chloro-methylbenzotriazole, tetrazole, substituted tetrazoles, thiazoles, such as 2-mercaptobenzothiazole, and the like. In one embodiment, the azole compound will be of the formula (I), (II), (III) or (IV):

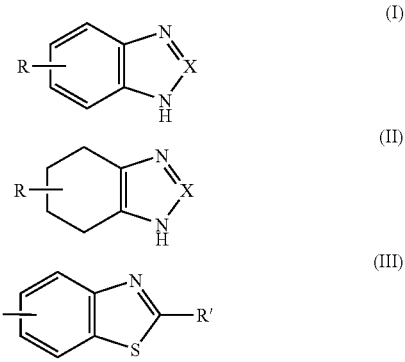

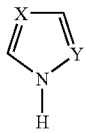

(IV)

wherein R is hydrogen, or halogen such as Cl or Br, or a $C_1$ to $C_{20}$ aliphatic or alkyl group; R' is selected from hydrogen, $C_1$ to $C_{20}$ aliphatic group, or SR or SH group; X is selected from N (or nitrogen atom), C—SH or CH; and Y is selected from N (or nitrogen atom), C—R or CH group. In one exemplary embodiment, the azole compound will be of formula (I) wherein X is N. In one particularly exemplary embodiment, the azole compound will be of formula (I) wherein X is N and R is hydrogen or an alkyl group of from 1 to less than 10 carbons.

As used herein, the term "alkyl" includes both branched and straight chain saturated aliphatic hydrocarbon groups, having the specified number of carbon atoms. The term $C_1$-$C_7$ alkyl as used herein indicates an alkyl group having from 1 to about 7 carbon atoms. When $C_0$-$C_n$ alkyl is used herein in conjunction with another group, for example, heterocycloalkyl($C_0$-$C_2$ alkyl), the indicated group, in this case heterocycloalkyl, is either directly bound by a single covalent bond ($C_0$), or attached by an alkyl chain having the specified number of carbon atoms, in this case from 1 to about 2 carbon atoms. Examples of alkyl include, but are not limited to, methyl, ethyl, n-propyl, isopropyl, n-butyl, 3-methylbutyl, t-butyl, n-pentyl, and sec-pentyl.

Illustrative examples of suitable azole compounds include benzotriazole, tolytriazole, methyl benzotriazole, i.e., 4-methyl benzotriazole and 5-methyl benzotriazole, butyl benzotriazole, mercaptobenzothiazole, benzimidazole, halobenzotriazoles, such as chloro-methylbenzotriazoles, and the like. In one embodiment, the azole compound will be one of benzotriazole, tolytriazole, or mercaptobenzothiazole, while in one exemplary embodiment, the azole compound will be benzotriazole.

In one embodiment, the azole compound may be present in the corrosion inhibiting heat transfer fluid in an amount of from 1 ppm to about 5000 ppm, while in one exemplary embodiment; the azole compound will be present in an amount of from 10 ppm to about 500 ppm, based on the total weight of the heat transfer fluid.

In one exemplary embodiment, the azole compound used in the inhibitor treatment solution will be the same as an azole compound used in the corrosion inhibitor of the fuel cell heat transfer fluid.

In one embodiment, the corrosion inhibitor for a fuel cell heat transfer fluid will also have at least one of a siloxane based surfactant, colloidal silica or a mixture thereof.

Siloxane based surfactants as used herein generally refers to polysiloxanes and organosilane compounds comprising at least one silicon-carbon bond.

In one embodiment, suitable polysiloxanes are generally those polysiloxanes believed to be of the general formula $R''_3$—Si—[O—Si(R'')$_2$]$_x$—OsiR''$_3$ wherein R'' is an alkyl group or polyalkylene oxide copolymer of from 1 to 200 carbons and x can be from 0 to 100. In one exemplary embodiment, suitable polysiloxanes will have at least one R'' group that is a hydrophilic group such as a polyalkylene oxide copolymer of one or more alkylene oxides having from 2 to 6 carbons, especially from 2 to 4 carbons.

It will be appreciated by those of skill in the art that commercially available polysiloxanes for which the structure is unknown or which is outside the scope of this formula may also be suitable for use in the corrosion inhibitor of a fuel cell heat transfer fluid.

For example, in one embodiment, suitable polysiloxanes may be defined by similarities to suitable commercially available polysiloxanes such as the Silwet® siloxane surfactants from GE Silicones/OSi Specialities, and other similar siloxane-polyether copolymers available from Dow Corning or other suppliers. In one exemplary embodiment, suitable siloxane based surfactants will be exemplified by Silwet® L-77, Silwet® L-7650, Silwet® L-7600, Silwet® L-7657, Silwet® L-7200, Silwet® L-7210, and the like.

Suitable organosilane compounds are those silane compounds comprising at least one silicon-carbon bond capable of hydrolyzing in the presence of water to form a silanol, i.e., a compound with one or more Si—OH groups. In one embodiment, suitable organosilane compounds are those of the general formula ZSi(OZ)$_3$ wherein the Z groups may be aromatic groups, cycloaliphatic groups, alkyl groups, alkoxy groups, or alkylene groups, and may contain heteroatoms such as N, S, or the like in the form of functional groups such as amino groups, epoxy groups, and the like. In one embodiment, suitable organosilane compounds are of the general formula Z'Si(OZ)$_3$ wherein Z' may be at least one of aromatic groups, cycloaliphatic groups, alkyl groups, alkoxy groups, or alkylene groups, and may contain heteroatoms such as N, S, or the like in the form of functional groups such as amino groups, epoxy groups, and the like, while Z is an alkyl group of from 1 to 5 carbons.

It will again be appreciated by those of skill in the art that commercially available organosilanes for which the structure is unknown or which is outside the scope of this formula may also be suitable for use in the corrosion inhibitor of a fuel cell heat transfer fluid.

For example, in one embodiment, suitable organosilanes may be defined by similarities to suitable commercially available organosilanes such as the Silquest® or Formasil® surfactants from GE Silicones/OSi Specialities, and other suppliers. In one exemplary embodiment, suitable siloxane based surfactants will be exemplified by Formasil 891, Formasil 593, formasil 433, Silquest Y-5560 silane (i.e., polyalkyleneoxidealkoxysilane), Silquest A-186 (2-(3,4-epoxycyclohexyl)ethyltrimethoxysilane), Silquest A-187 (3-glycidoxypropyltrimethoxysilane), or other Silquest silanes available from GE Silicones, Osi Specialties or other suppliers and the like.

Other suitable organosilanes which are believed to be commercially available and are illustrative of suitable siloxane based surfactants include 3-aminopropyltriethoxysilane, N-2-(aminoethyl)-3-aminopropyltrimethoxysilane, octyltriethoxysilane, vinyltriethoxysilane, vinyltrimethoxysilane, methyltriethoxysilane, 3-methacryloxypropyltrimethoxysilane, 3-mercaptopropyltrimethoxysilane, isobutyltrimethoxysilane, phenyltrimethoxysilane, methyltrimethoxysilane, and other such siloxane based surfactants having similar structures but varying numbers of carbons.

In one embodiment, the siloxane based surfactant may be present in the corrosion inhibiting heat transfer fluid in an amount of from 0.01 wt % to about 10 wt %, based on the total weight of the heat transfer fluid, while in one exemplary embodiment; the siloxane based surfactant will be present in the corrosion inhibiting heat transfer fluid in an amount of from 0.02 wt % to about 2 wt %, based on the total weight of the heat transfer fluid.

In addition to or in place of the siloxane based surfactant, the corrosion inhibiting heat transfer fluid may also comprise silica. The term 'silica' as used herein refers to either colloidal silica, silica in nano-form or a combination thereof. The terms 'colloidal silica' and 'silica' are used herein interchangeably. While not wishing to be bound to a particular theory, it is believed that the use of colloidal silica of a particular average particle size provides improvements in heat transfer efficiency and/or the heat capacity of a fuel cell heat transfer fluid.

In one embodiment, suitable silica will have a nominal particle size of from about 1 nm to about 200 nm. In one exemplary embodiment suitable silica will have an average particle size of from about 1 nm to about 100 nm while in one especially exemplary embodiment, suitable silica will have an average particle size of from 1 nm to about 40 nm.

Suitable silica having the appropriate particle size is commercially available under the Ludox® brand from DuPont or Grace Davidson, under the Nyacol® or Bindzil® brands from Akzo Nobel or Eka Chemicals, under the Snowtex® brand from Nissan Chemical. Other suppliers of suitable silica include Nalco and the like.

In one embodiment, the silica will be used in the corrosion inhibiting heat transfer fluid in an amount of no more than 10,000 ppm, while in one exemplary embodiment; the silica will be used in an amount of less than 2000 ppm.

It will also be appreciated that the corrosion inhibitor of the corrosion inhibiting heat transfer fluid may also comprise a combination of the siloxane based surfactant and silica. In one embodiment, the corrosion inhibitor will comprise a combination of the azole compound and the disclosed siloxame compound. In one especially exemplary embodiment, the corrosion inhibitor will consist of the azole and siloxane combination.

In one embodiment, the heat transfer fluid intended for use with the disclosed pre-treated ion exchange resins or in the disclosed heat transfer systems, assemblies, or fuel cell systems will also comprise a colorant. In one embodiment, the heat transfer fluid will comprise a colorant that is a non-ionic or weakly ionic species that are soluble or dispersible in the at least one alcohol or a mixture of the disclosed alcohols and water.

In one embodiment a suitable colorant will be a non-conductive colorant that is substantially free of functional groups that will form an ionic species due to hydrolysis in an aqueous alcohol or alkylene glycol solution. "Substantially free" as used herein refers to an amount that is not in excess of an amount that will lead to the conductivity of the heat transfer fluid being higher than 5 μS/cm. Examples of the functional groups that will produce small amounts of ionic species include many N-containing compounds, e.g., acridine, amine, thiazole, cresol, etc. Compounds containing sulfonic acid groups, phosphonic acid groups, carboxylic acid groups, etc. will also produce ionic species upon hydrolysis in aqueous solution. Since these groups have a smaller $pK_a$ value, the solution is more ionic or conductive than the previous group (i.e., the N-containing compounds).)

In one specific embodiment, a non-conductive heat transfer fluid colorant will be substantially free of functional groups selected from the group consisting of carboxylate groups, sulfonate groups, phosphonate groups, quaternary ammonium cation groups, groups that carry a positive charge, and groups that carry a negative charge. Illustrative examples of groups that carry a positive charge include $Na^+$, $Cu^{2+}$, $N^+(CH_3)_3$, $Fe^{3+}$, combinations thereof, and the like. Illustrative examples of groups that carry a negative charge include $Cl^-$, $Br^-$, $SO_4^{2-}$, combinations thereof, and the like.

Suitable heat transfer fluid colorants may comprise at least one of the following chromophores: anthraquinone, triphenylmethane, diphenylmethane, azo containing compounds, disazo containing compounds, trisazo containing compounds, diazo containing compounds, xanthene, acridine, indene, phthalocyanine, azaannulene, nitroso, nitro, diarylmethane, triarylmethane, methine, indamine, azine, oxazine, thiazine, quinoline, indigoid, indophenol, lactone, aminoketone, hydroxyketone, stilbene, thiazole, one or more conjugated aromatic groups, one or more conjugated heterocyclic groups (e.g., stilkene, and or bestriazenylamino-stilkene, and/or pyrazoline, and/or coumarine type molecules or mixtures thereof), one or more conjugated carbon-carbon double bonds (e.g., carotene), and combinations thereof. In one exemplary embodiment, the heat transfer fluid colorant will comprise at least one of diarylmethane, triarylmethane, triphenylmethane, diphenylmethane, one or more conjugated aromatic groups, azo, or combinations thereof. In one especially exemplary embodiment, the heat transfer fluid colorant will comprise at least one or more conjugated aromatic groups as a chromophore.

In another embodiment, the heat transfer fluid colorant will comprise the reaction product of non-conductive alkoxy compounds and at least one chromophore such as described above. Illustrative examples of suitable non-conductive alkoxy compounds include those having from 1 to 30 carbons. Illustrative alkoxy compounds include ethylene oxide, propylene oxide, butylene oxide, and the like, with ethylene oxide and propylene oxide being particularly suitable. In one embodiment, the chromophore reacted with the alcohol will be selected from the group consisting of anthraquinone, triphenylmethane, diphenylmethane, diarylmethane, triarylmethane, azo containing compounds, disazo containing compounds, trisazo containing compounds, diazo containing compounds, and combinations thereof.

Alternatively, suitable heat transfer fluid colorants may be described as those colorants with the formula:

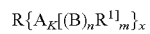

$$R\{A_K[(B)_n R^{1]}{}_m]\}_x$$

wherein R is an organic chromophore selected from the group consisting of anthraquinone, triphenylmethane, diphenylmethane, azo containing compounds, disazo containing compounds, trisazo containing compounds, diazo containing compounds, xanthene, acridine, indene, phthalocyanine, azaannulene, nitroso, nitro, diarylmethane, triarylmethane, methine, indamine, azine, oxazine, thiazine, quinoline, indigoid, indophenol, lactone, aminoketone, hydroxyketone, stilbene, thiazole, two or more conjugated aromatic groups, two or more conjugated heterocyclic groups, or combinations thereof; A is a linking moiety in said chromophore and is selected from the group consisting of O, N or S; k is 0 or 1; B is selected from the group consisting of one or more alkyleneoxy or alkoxy groups containing from 1 to 8 carbon atoms; n is an integer of from 1 to 100; m is 1 or 2; x is an integer of from 1 to 5; and $R^1$ is selected from the group consisting of H, $C_1$—$C_6$ alkyl or alkoxy groups containing from 1 to 8 carbon atoms, or combinations thereof.

In one exemplary embodiment, suitable heat transfer fluid colorants are those colorants of the above formula wherein B is selected from the group of one or more alkyleneoxy constitutuents containing from 2 to 4 carbon atoms, n is from 1 to 30, m is 1 or 2, X is preferably 1 or 2, and $R^1$ is preferably H or a $C_1$-$C_4$ alkyl or alkoxy groups containing from 1 to 6 carbon atoms. In one exemplary embodiment, suitable heat transfer fluid colorants are those containing one or more of diarylmethane, triarylmethane, triphenylmethane, diphenylmethane, conjugated aromatic groups or conjugated carbon-carbon double bonds or a combination thereof, since such are not expected to contribute to conductivity increase from the chromophore. In other words, these chromophore structures have no groups that will hydrolyze. Among the listed linking group, O may also be less likely to hydrolyze in aqueous solution.

The heat transfer fluid colorants may be prepared by various known methods as are described above with respect to the treatment inhibitors.

Commercially available examples of suitable heat transfer fluid colorants for use in corrosion inhibiting heat transfer fluids suitable for use in the disclosed fuel cells and fuel cell systems include Liquitint® Red ST or other similar polymeric colorants from Milliken Chemical of Spartanburg, S.C., USA, or colorants (e.g., Liquitint® Blue RE) from Chromatech of Canton, Mich., USA. Other illustrative colorants include the following: Liquitint Red ST, Liquitint Blue RE, Liquitint Red XC, Liquitint Patent Blue, Liquitint Bright yellow, Liquitint Bright orange, Liquitint Royal Blue, Liquitint Blue N-6, Liquitint Bright Blue, Liquitint Supra Blue, Liquitint Blue HP, Liquitint Blue DB, Liquitint Blue II, Liquitint Exp. Yellow 8614-6, Liquitint Yellow BL, Liquitint Yellow II, Liquitint Sunbeam Yellow, Liquitint Supra yellow, Liquitint Green HMC, Liquitint violet, Liquitint Red BL, Liquitint Red RL, Liquitint Cherry Red, Liquitint Red II, Liquitint Teal, Liquitint Yellow LP, Liquitint Violet LS, Liquitint Crimson, Liquitint Aquamarine, Liquitint Green HMC, Liquitint Red HN, Liquitint Red ST, as well as combinations thereof.

In one exemplary embodiment, the heat transfer fluid colorant will be at least one of Liquitint® Red ST from Milliken, Liquitint® Red XC from Chromatech, Liquitint® Patent Blue from Milliken, Chromatint® Yellow 1382 from Chromatech or Liquitint® Blue® RE from Chromatech, while in an especially exemplary embodiment, the non-conductive colorant will be Liquitint® Blue RE from Chromatech.

In one exemplary embodiment, the heat transfer fluid colorant will be present in the corrosion inhibiting heat transfer fluid in an amount of from 0.0001 to 0.2% by weight, based on the total amount of the corrosion inhibiting heat transfer fluid. In another embodiment, the heat transfer fluid colorant will be present in the heat transfer fluid in an amount of from 0.0005-0.1% by weight, based on the total amount of the heat transfer fluid, while in one exemplary embodiment, the heat transfer fluid colorant will be used in an amount of from 0.0005 to 0.05% by weight, based on the total amount of the heat transfer fluid.

Illustrative examples of suitable alcohols for use in the disclosed heat transfer fluids are methanol, ethanol, propanol, butanol, furfurol, ethylene glycol, diethylene glycol, triethylene glycol, 1,2-propylene glycol, 1,3-propylene glycol, dipropylene glycol, butylene glycol, glycrol, monoethylether of glycerol, dimethyl ether of glycerol, 1,2,6-hexanetriol, trimethylolpropane, methoxyethanol, or a combination comprising one or more such alcohols. Illustrative examples of particularly suitable alcohols include ethylene glycol, propylene glycol, butyl glycol, glycerol, diethylene glycol, and the like, as well as mixtures thereof. In one embodiment, the alcohol will be ethylene glycol or 1,2-propylene glycol or 1,3-propylene glycol, while in one exemplary embodiment; the disclosed heat transfer fluid will comprise ethylene glycol.

In one embodiment, the alcohol will be present in the heat transfer fluid in an amount of from 10-99.9% by weight, based on the total amount of the heat transfer fluid. In another embodiment, the at least one alcohol will be present in the heat transfer fluid in an amount of from 20-99.9% by weight, based on the total amount of the heat transfer fluid, while in one exemplary embodiment, the at least one alcohol will be used in an amount of from 20 to 99.9% by weight, based on the total amount of the heat transfer fluid.

As previously indicated, water may be present in the disclosed corrosion inhibiting heat transfer fluids. In one exemplary embodiment, deionized water will be used. In one embodiment, water will be present in the corrosion inhibiting heat transfer fluid in an amount of from 0.1-90% by weight, based on the total amount of the heat transfer fluid. In another embodiment, water will be present in the heat transfer fluid in an amount of from 0.1-80% by weight, based on the total amount of the heat transfer fluid, while in one exemplary embodiment, water will be used in an amount of from 0.1 to 70% by weight, based on the total amount of the corrosion inhibiting heat transfer fluid.

For example, water may not be present in the concentrate version of a heat transfer fluid at all, i.e., 0 wt % but may be present in some concentrates in amounts up to about 50 wt % while in other embodiments water may be present in a concentrate in an amount up to about 20 wt %. With regards to diluted heat transfer fluids, water may be present in amounts of from 20 wt % up to 90% wt.

Suitable optional corrosion inhibitors include aluminum and aluminum based alloy corrosion inhibitors, copper and copper based alloy corrosion inhibitors, ferrous metal corrosion inhibitors, amines such as ethanolamine, diethanol amines, triethanolamine, octylamine and morpholine, orthosilicate ester as described in US2004/0028971A1 and the like. In one embodiment, one or more optional corrosion inhibitors will be present in the heat transfer fluid in an amount of from 0.0 to 10.0% by weight, based on the total amount of the heat transfer fluid. In another embodiment, one or more corrosion inhibitors will be present in the heat transfer fluid in an amount of from 0.0-5% by weight, based on the total amount of the heat transfer fluid.

Suitable heat transfer fluids may also comprise additional additives such as defoamers, surfactants, scale inhibitors, dispersants, wetting agents, bittering agents, and the like, as well as combinations thereof, in amounts of up to 10 % by weight, based on the total amount of the heat transfer fluid.

In one embodiment, suitable heat transfer fluids will comprise from 20-99.9% by weight of at least one alcohol or an alcohol mixture, from 0.1-80% by weight of water, and from 0.0001 to 0.1% by weight of a non-conductive colorant, based on the total amount of the heat transfer fluid, and 0.0 to 10% by weight of other optional heat transfer fluid additives. In one exemplary embodiment, the disclosed fuel cell heat transfer fluids will comprise from 20-99.9% by weight of at least one alcohol or an alcohol mixture, from 0.1-80% by weight of water, and from 0.0001 to 0.1% by weight of a non-conductive colorant, and 0.0 to 10% by weight of other heat transfer fluid additives based on the total amount of the heat transfer fluid.

In another exemplary embodiment, suitable heat transfer fluids will comprise from 20-99.9% by weight of at least one alcohol, from 0.1-80% by weight of water, from 0 to 5% by weight of one or more corrosion inhibitors, and from 0.0001 to 0.1% by weight of a non-conductive colorant and an optional antifoam agent in an amount of from 0.0 to 0.1% by weight, based on the total amount of the heat transfer fluid.

The disclosed heat transfer fluids may be prepared by mixing the components together. Normally, the alcohol and water are preferably mixed together first. The other additives are then added to the alcohol-water mixture by mixing and adequate stirring.

The disclosed pre-treated ion exchange resins are advantageous in that they are capable of removing ionic species from a treatment solution or heat transfer fluid, maintaining low conductivity in a heat transfer fluid and providing a beneficial property such as color to a heat transfer fluid. The disclosed pre-treated ion exchange resins are also advantageous in that they are capable of simultaneously removing ionic species from a heat transfer fluid, maintaining low conductivity in a heat transfer fluid and providing a beneficial property such as color to a corrosion inhibiting heat transfer fluid.

The singular forms "a", "an" and "the" include plural referents unless the context clearly dictates otherwise. "Optional" or "optionally" means that the subsequently described event or circumstance may or may not occur, and that the description includes instances where the event occurs and instances where it does not. The modifier "about" used in connection with a quantity is inclusive of the stated value and has the meaning dictated by the context (e.g., includes the degree of error associated with measurement of the particular quantity).

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

Example 1

The effect of mixed bed ion exchange resins upon conductivity in a fuel cell system was evaluated. The tests were conducted in a simulated fuel cell stack with a heat transfer system. The test unit contains a simulated fuel cell stack with alternating silicone gasket and stainless steel plate stack one above another to simulate a fuel cell stack. The stack simulated 50 cells connected in series. During the tests, 50 to 60 volts DC were applied across the simulated stack. The test unit also contains a heat transfer fluid tank, coupon holders, flow and pressure meters, an electrical heater, a pump, pH, temperature and conductivity sensors, etc. to simulate a fuel cell heat transfer system. The outputs from the sensors were recorded by a computer controlled data acquisition system. The data resulting from the tests is shown in the following FIGS. 2, 3, 4, and 5. It can be seen that mixed bed ion exchange resins are required for maintaining a fuel cell heat transfer fluid conductivity lower than 4 µS/cm for operation longer than several hours.

Example 2

Tests were conducted to evaluate whether benzotriazole (i.e., BZT) was removed by mixed bed ion exchange resin during prolonged contact. 10 grams of a Dow mixed bed resin were added into three glass beakers each containing 1000 ml, 500 ml and 250 ml BZT containing 50% ethylene glycol solution. The BZT concentration was determined to be 1284 ppm. The solutions were agitated via a Teflon-coated magnetic stirring bar. The conductivity and the BZT concentrations were measured before and after 22 hours exposure with the resin. The results are shown in the Table 1 below. One can see that BZT is removed by mixed bed resin from the solution. Conductivity of the solutions was also reduced after the treatment with the ion exchange resin.

TABLE 1

| Solution ID | BZT (ppm) | Conductivity (µS/cm) | Temp (C.) |
|---|---|---|---|
| 1200 ppm BZT Stock solution | 1282 | 0.71 | 22.7 |
| 1000 ml 1200 ppm BZT + 10 g Mixed bed resin for 22 Hours | 142 | 0.27 | 22.7 |
| 500 ml 1200 ppm BZT + 10 g Mixed Bed Resin for 22 hours | 0 | 0.10 | 22.7 |
| 250 ml 1200 ppm BZT + 10 g Mixed Bed resin for 22 hours | 0 | 0.10 | 22.7 |

Experiment 3

The effectiveness of the BZT treated mixed resins from Example 2 in reducing conductivity in fuel cell heat transfer fluids contaminated with ionic species (e.g., 30 ppm NaCl) was evaluated as set forth in Table 2. In addition, the corrosion inhibiting properties of a heat transfer fluid passing through the disclosed BZT treated mixed resins was evaluated with respect to the corrosion protection for Cartridge Brass (70% Cu-30% Zn). The heat transfer fluid was an aqueous solution of 50% vol EG+100 ppm Cl at 80° C. Note: BZT was exchanged in 100 ml 50% EG solution with 30 ppm NaCl.

TABLE 2

| Treatment | Tefel Corr. Rate (mpy) | LPR Rate (mpy) | ppm BZT in solution | Ecorr (V/AgAgCl) | Rp (kohm/cm^2) |
|---|---|---|---|---|---|
| Blank | 1.15 | 1.05 | 0 | −0.080 | 22.6 |
| 250 ml 1200 ppm BZT | 1.06 | N.D. | Not detectable | −0.080 | |
| 500 ml 1200 ppm BZT | 0.24 | 0.52 | Trace | −0.083 | 32.3 |
| 1000 ml 1200 ppm BZT | 0.04 | 0.03 | 102 | −0.011 | 400.0 |

Figure 6:
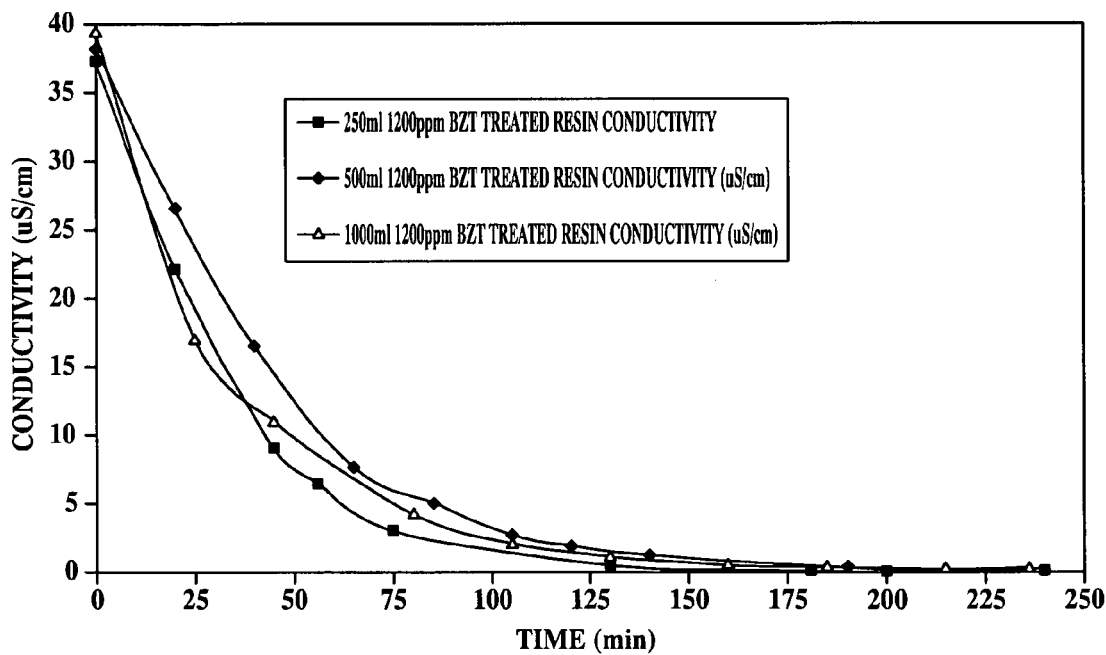
FIG. 6 is a graph illustrating the ability of the disclosed pre-treated ion exchange resins to remove an ionic species from a heat transfer fluid.
Figure 7:
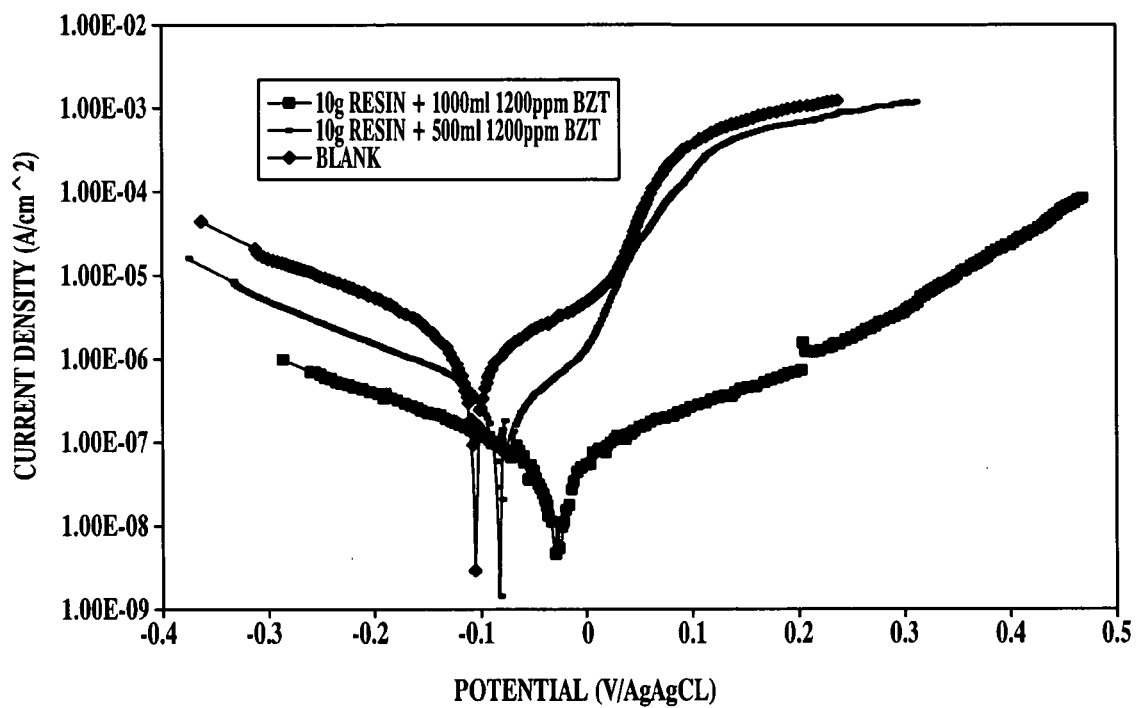
FIG. 7 is a polarization curve measurement results illustrating the effect of the disclosed pre-treated ion exchange resins upon corrosion protection of metal sample.

The results shown in the FIGS. 6 and 7 and Table 2 demonstrate the following: 1. The BZT treated mixed bed resins are still effective in removal of ionic contamination in glycol based fuel cell heat transfer fluids; 2.BZT is being exchanged from the resin by the ionic species in the heat transfer fluid; 3. Excellent corrosion protection and low conductivity in the glycol-based heat transfer fluids can be obtained by using BZT-treated mixed bed resin as treatment method.

Example 4

The corrosion inhibiting effect of heat transfer fluids containing the disclosed corrosion inhibitors upon various metals was evaluated using the Modified ASTM D1384 test. Samples as indicated in Table 3 were prepared with different corrosion inhibitors as well as a blank. The test was conducted at 88° C. for a duration of 336 hours. The base solution used in all test samples was 52% wt Glycol+48% DI water. The corrosion protection of each heat transfer fluid sample was evaluated with three cast Al coupons (UNS A23190) and three Brass coupons (UNS C26000). Mass loss for the aluminum and brass are set forth below as well as the appearance of the aluminum coupons and the initial and final conductivity of the sample heat transfer fluids.

TABLE 3

| Inhibitor | Al Mass Loss (mg) | STDEV-Al (mg) | Brass Mass loss (mg) | STDEV-Brass (mg) | Al Coupon appearance | Al Protection Rating | Initial μS/cm | After μS/cm |
|---|---|---|---|---|---|---|---|---|
| Blank | −0.7 | 0.5 | 44.1 | 2.7 | Localized attack on 15% of the surface | 2 | 0.32 | 27.8 |
| 40 ppm BZT + 2 g UP6040IX resin | −2.3 | 0.2 | 2.3 | 0.1 | Light staining and a few pitting attack | 4 | 0.34 | 0.45 |
| 0.2% wt Silwet L-77 | −1.4 | 0.4 | 38.0 | 0.4 | Localized attack on 20% of the surface | 2 | 0.52 | 24.7 |
| 0.2% wt Silwet L-77 + 40 ppm BZT + 2 g UP6040 IX resin | −2.5 | 0.2 | 1.4 | 0.8 | Light staining, no pitting | 9 - Best | 0.53 | 0.35 |
| 1040 ppm BZT | −2.4 | 0.2 | 1.7 | 0.3 | Many pitting attack sites on the surface | 3 | 0.52 | 2.09 |
| 0.2% wt Silwet L-7650 | −0.2 | 1.4 | 42.2 | 2.4 | Localized attack on 20% of the surface | 1 - Worst | 0.33 | 34.8 |
| 0.2% wt Silwet L-7650 + 40 ppm BZT | −2.6 | 0.5 | 0.8 | 0.2 | Light staining & localized attack on 10% surface | 4 | 0.34 | 3.27 |

Note:
Mass loss data are the mean of the 3 values in this set of data

Example 5

The corrosion inhibiting effect of heat transfer fluids containing the disclosed corrosion inhibitors upon various metals was again evaluated using the Modified ASTM D1384 test. Samples as indicated in Table 4 were prepared with different corrosion inhibitors as well as a blank. The test was conducted at 88 C. for a duration of 336 hours. The base solution used in all test samples was 52% wt Glycol+48% DI water. The corrosion protection of each heat transfer fluid sample was evaluated with one cast Al coupon (UNS A23190) and one Brass coupon (UNS C26000). Mass loss for the aluminum and brass are set forth below as well as the appearance of the aluminum coupons and the initial and final conductivity of the sample heat transfer fluids.

TABLE 4

| Inhibitor | Al Mass Loss (mg) | STDEV-Al (mg) | Brass Mass loss (mg) | STDEV-Brass (mg) | Al Coupon appearance | Al Protection Rating | Initial μS/cm | After μS/cm |
|---|---|---|---|---|---|---|---|---|
| Blank | −2.1 | N.A. | 47.1 | N.A. | Localized attack on 15% of the surface | 3 - Worst | 0.35 | 14.85 |
| 40 ppm BZT | −3.8 | N.A. | 1.0 | N.A. | 70% of surface stained | 5 | 0.38 | 2.66 |
| 0.1% wt Silwet L-77 | −2.5 | N.A. | 33.9 | N.A. | 25% surface stained, a few localized attack sites | 5 | 0.34 | 11.65 |
| 0.1% wt Silwet L-77 + 40 ppm BZT | −3.7 | N.A. | 0.9 | N.A. | No apparent corrosion attack, shiny surface | 10 - Best | 0.38 | 2.97 |
| 0.1% wt Silwet L-7650 | −3.3 | N.A. | 73.1 | N.A. | Localized attack on 12% of the surface | 4 | 0.36 | 34.7 |
| 0.1% wt Silwet L-7650 + 40 ppm BZT | −3.9 | N.A. | 0.3 | N.A. | 5% surface staining, a small localized attack site | 7 | 0.36 | 8.11 |

The invention claimed is:

1. A pre-treated ion exchange resin comprising ion exchangeable groups, wherein at least 15% of the ion exchangeable groups comprise a Lewis acid or a Lewis base resulting from a heat transfer fluid component having a $pK_a$ or $pK_b$ of greater than 5 in an aqueous solution at 25° C. prior to contact with a heat transfer system, and wherein a particle size of the ion exchange resin ranges from 38 microns to 2000 microns.

2. The pre-treated ion exchange resin of claim 1 wherein the heat transfer fluid component has a $pK_a$ or $pK_b$ of from 5 to 14 in an aqueous solution at 25° C.

3. The pre-treated ion exchange resin of claim 1 wherein the heat transfer fluid component is selected from the group consisting of a colorant, a corrosion inhibitor, an antifoaming agent, a bitterant, a dispersant, and a combination thereof.

4. A heat transfer system, comprising
a circulation loop defining a flow path for a heat transfer fluid having a conductivity of less than 10 μS/cm, and an ion exchange resin in a filter positioned in the flow path so that the heat transfer fluid must flow through the ion exchange resin, the ion exchange resin comprising ion exchangeable groups, wherein at least 15% of the total ion exchangeable groups comprise at least one of an ion, or a Lewis acid, or a Lewis base resulting from a heat transfer fluid component having a $pK_a$ or $pK_b$ of greater than 5 in an aqueous solution at 25° C. prior to contact with a heat transfer system, and wherein a particle size of the ion exchange resin ranges from 38 microns to 2000 microns.

5. The heat transfer system of claim 4, wherein the heat transfer fluid component comprises a treatment corrosion inhibitor that comprises an azole compound.

6. The heat transfer system of claim 4, wherein the heat transfer fluid has a conductivity of less than 200 μS/cm.

7. The heat transfer system of claim 6, wherein the heat transfer fluid has conductivity from 0.05 to 10 μS/cm.

8. The heat transfer system of claim 4, wherein the ion exchange resin comprises at least 50% of exchangeable groups comprising a treatment corrosion inhibitor, based on the total number of exchangeable groups.

9. The heat transfer system of claim 8, wherein the ion exchange resin comprises at least 75% of exchangeable groups comprising the treatment corrosion inhibitor, based on the total number of exchangeable groups.

10. The heat transfer system of claim 5 wherein the azole compound is at least one of formula (I), (II) (III) or (IV):

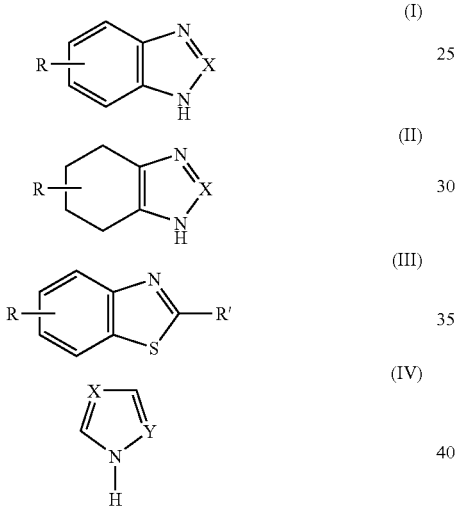

wherein
R is hydrogen, halogen, or a $C_1$ to $C_{20}$ alkyl group;
R' is at least one of hydrogen, $C_1$ to $C_{20}$ alkyl group, SH group, or SR group;
X is N, C—SH or CH; and
Y is selected from N, C—R, where R is defined as above, or CH group.

11. The heat transfer system of claim 4 wherein the corrosion inhibiting heat transfer fluid further comprises an alcohol that is at least one of methanol, ethanol, propanol, butanol, furfurol, ethylene glycol, diethylene glycol, triethylene glycol, 1,2-propylene glycol, 1,3-propylene glycol, dipropylene glycol, butylene glycol, glycrol, monoethylether of glycerol, dimethyl ether of glycerol, 1,2,6-hexanetriol, trimethylolpropane, methoxyethanol, or a combination thereof.

12. The heat transfer system of claim 5 wherein the heat transfer fluid comprises a heat transfer fluid corrosion inhibitor.

13. The heat transfer system of claim 12 wherein the heat transfer fluid corrosion inhibitor comprises an azole compound.

14. The heat transfer system of claim 12 wherein the treatment corrosion inhibitor and the heat transfer fluid corrosion inhibitor comprise the same azole compound.

15. The heat transfer system of claim 14 wherein the heat transfer fluid corrosion inhibitor further comprises at least one of a siloxane based surfactant, a colloidal silica or a mixture thereof.

16. An assembly powered by an alternative power source comprising
an alternative power source and
a heat transfer system in thermal communication with the alternative power source, the heat transfer system comprising
a circulation loop defining a flow path for a heat transfer fluid having a conductivity of less than 200 μS/cm, and
an ion exchange resin in a filter positioned in the flow path so that the heat transfer fluid must flow through the ion exchange resin, the ion exchange resin comprising ion exchangeable groups, wherein at least 15% of ion exchangeable groups comprise at least one of an ion, or a Lewis acid, or a Lewis base resulting from a heat transfer fluid component having a $pK_a$ or $pK_b$ of greater than 5 in an aqueous solution at 25° C. prior to contact with a heat transfer system, and wherein a particle size of the ion exchange resin ranges from 38 microns to 2000 microns.

17. The assembly of claim 16 wherein the ion results from a treatment corrosion inhibitor.

18. The heat transfer system of claim 10, wherein the halogen is Cl or Br.

* * * * *